United States Patent [19]

Higuchi et al.

[11] Patent Number: 5,757,098
[45] Date of Patent: May 26, 1998

[54] NON-CONTACT MAGNETIC SUSPENSION APPARATUS USING DISTORTION OF PINNED SUPERCONDUCTOR FIELD

[75] Inventors: Toshiro Higuchi, Yokohama; Yukio Tsutsui, Kawasaki, both of Japan

[73] Assignee: Kanagawa Academy of Science and Technology, Japan

[21] Appl. No.: 507,276

[22] PCT Filed: Jan. 24, 1995

[86] PCT No.: PCT/JP95/00075

§ 371 Date: Aug. 30, 1995

§ 102(e) Date: Aug. 30, 1995

[87] PCT Pub. No.: WO95/20264

PCT Pub. Date: Jul. 27, 1995

[30] Foreign Application Priority Data

Jan. 25, 1994 [JP] Japan ................. 6-006154
Nov. 29, 1994 [JP] Japan ................. 6-294082

[51] Int. Cl.$^6$ ............... H02N 15/04; F16C 32/04
[52] U.S. Cl. ............... 310/90.5; 310/12; 310/13; 310/74; 505/166; 505/876; 505/877
[58] Field of Search ............... 310/90.5, 74, 12, 310/13; 384/626; 335/216; 505/166, 876, 877, 878

[56] References Cited

U.S. PATENT DOCUMENTS

| | | | |
|---|---|---|---|
| 4,939,120 | 7/1990 | Moon et al. .................. | 310/90.5 |
| 5,159,219 | 10/1992 | Chu et al. .................. | 310/90.5 |
| 5,177,387 | 1/1993 | McMichael et al. .......... | 310/90.5 |
| 5,220,232 | 6/1993 | Rigney, II et al. .......... | 310/90.5 |
| 5,256,637 | 10/1993 | Rao .......................... | 505/1 |
| 5,313,130 | 5/1994 | Shibayama et al. .......... | 310/90.5 |
| 5,314,868 | 5/1994 | Takahata et al. ........... | 505/166 |
| 5,319,275 | 6/1994 | Tozoni ...................... | 310/90.5 |
| 5,342,825 | 8/1994 | Iannello et al. ............ | 505/166 |
| 5,495,221 | 2/1996 | Post ........................ | 335/299 |
| 5,532,532 | 7/1996 | Devault et al. ............ | 310/52 |

*Primary Examiner*—Steven L. Stephan
*Assistant Examiner*—Tran N. Nguyen
*Attorney, Agent, or Firm*—Lorusso & Loud

[57] ABSTRACT

A ferromagnetic member (21) of a movable part (2) is disposed on a side of a stationary part (1) such that the ferromagnetic member (21) faces a high temperature superconductor (11) of the stationary part (1). The high temperature superconductor (11) is brought into a superconductive state by cooling it to a temperature below a critical temperature in a magnetic field. The magnetic flux pinned to the high temperature superconductor (11) is caused to pass through the ferromagnetic member (21) so that an attractive force is generated between the high temperature superconductor (11) and the ferromagnetic member (21) to hold the movable part (2). When the ferromagnetic member (21) has a shape such that when the gap becomes lower than a predetermined value, the attractive force decreases, the movable part (2) can be stably suspended in a non-contacting manner, without the necessity of control, by the combination of the high temperature superconductor (11) and the ferromagnetic member (21).

8 Claims, 13 Drawing Sheets

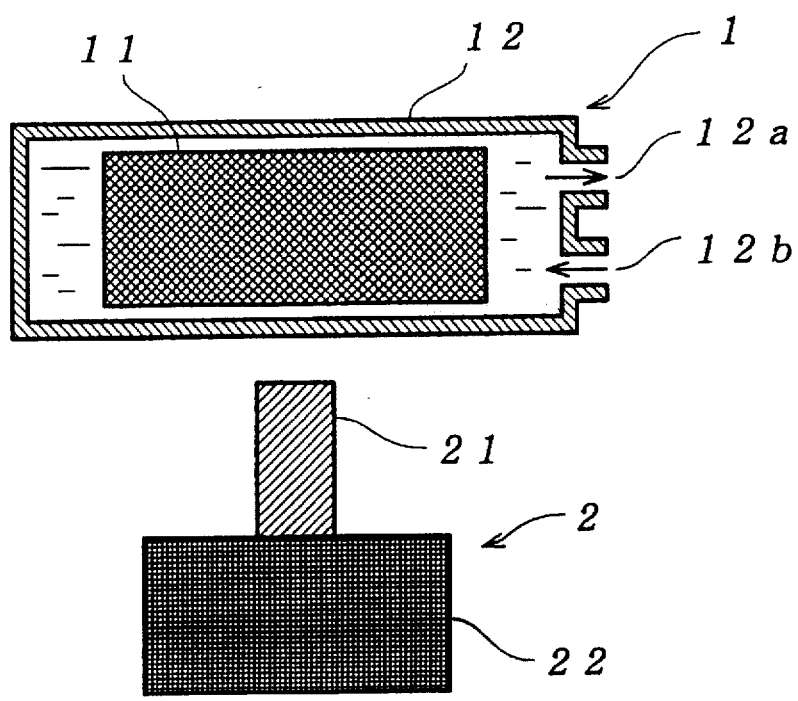
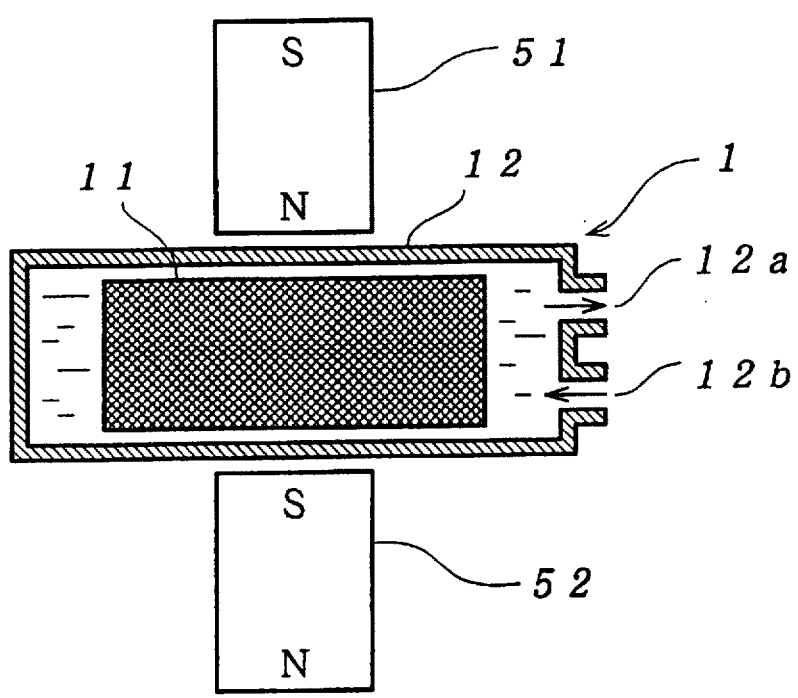

F I G. 9
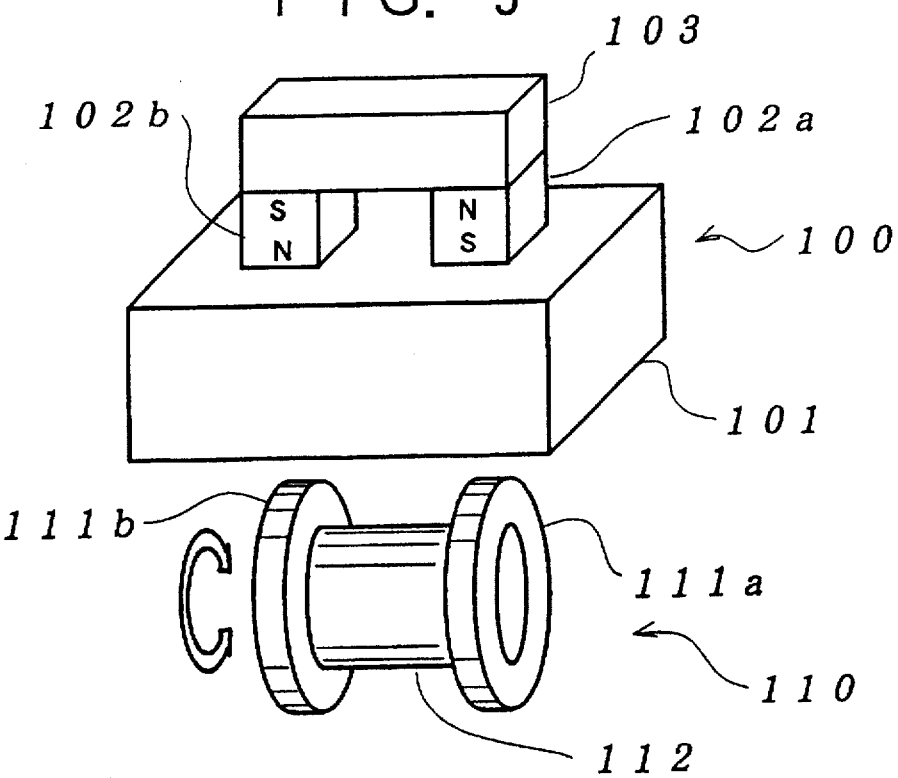
F I G. 10
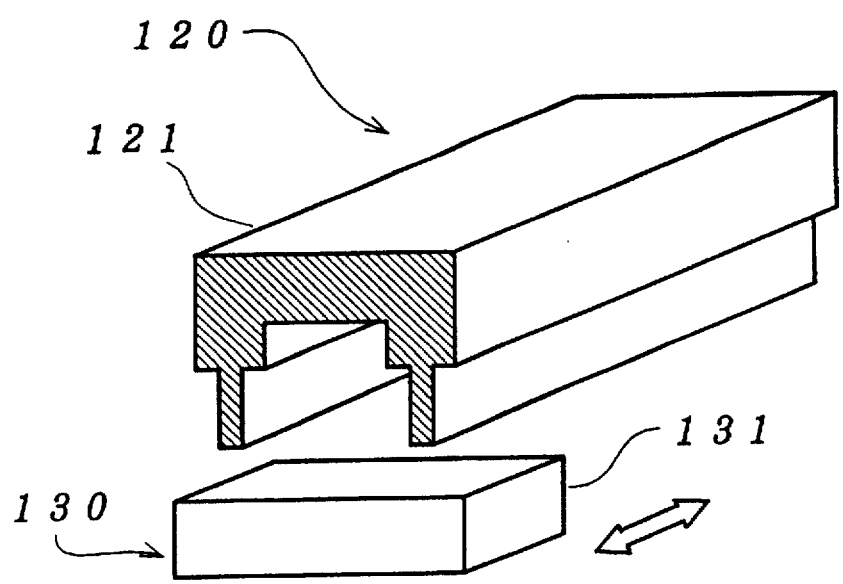

NON-CONTACT MAGNETIC SUSPENSION APPARATUS USING DISTORTION OF PINNED SUPERCONDUCTOR FIELD

TECHNICAL FIELD

The present invention relates to a magnetic suspension apparatus using a superconductor.

BACKGROUND ART

Conventionally, attractive type and repulsive type magnetic suspension apparatuses utilizing an electromagnet, a permanent magnet, and a ferromagnetic material have been used to levitate a movable part relative to a stationary part in a non-contacting manner.

Japanese Patent Application Laid-Open (kokai) No. 63-262056 discloses a suspension apparatus, applied to a motor, which utilizes repulsive force produced between a high temperature superconductor and a permanent magnet, i.e., force produced due to the Meissner effect.

Another mechanism which also utilizes a high temperature superconductor and a permanent magnet in combination has been proposed (the Linear Drive Study Group of the Institute of Electrical Engineers of Japan, Material No. 91–111, pp. 127–136). The mechanism utilizes force produced due to the so-called magnetic flux pinning effect to levitate and support a movable part. The pinning effect occurs when part of the magnetic flux produced by the permanent magnet is captured within the high temperature superconductor, and a force is produced to maintain the relative positional relationship between the permanent magnet and the high temperature superconductor. In this mechanism, the movable part is stably suspended with respect to the stationary part with a predetermined gap therebetween. Also, the position of the movable part in a direction perpendicular to the direction of the gap can be stably maintained such that the magnetic field applied from the permanent magnet to the high temperature superconductor does not change.

Since the force produced by the pinning effect is far larger than the force produced by the Meissner effect, the suspending stiffness can be increased.

However, in conventional suspension apparatuses using an electromagnet, a permanent magnet, and a ferromagnetic material, current must be continuously supplied to the electromagnet while the movable part is being suspended. Also, a large amount of electric power or a large electromagnet is needed to obtain a strong suspending force. Moreover, the electromagnet must be arranged in each of a plurality of directions to safely maintain the movable part at a predetermined position.

Furthermore, when the gap between the stationary part and the movable part is controlled, the current supplied to the electromagnet must be always controlled based on the size of the gap which is fed back to the control section. In this case, the movable part slightly vibrates depending on the processing speed of the control circuit and the speed of sampling the size of the gap.

In the suspension apparatus utilizing the Meissner effect of a superconductor as disclosed in Japanese Patent Application Laid-Open No. 63-262056, a suspending force can be always obtained without using an electromagnet. However, since only repulsive force is produced between the superconductor and the permanent magnet, the apparatus is very instable by itself. Therefore, a mechanism must be added to maintain the predetermined gap and the predetermined position. Since the repulsive force due to the Meissner effect is very small compared to the magnetic attractive and repulsive forces of a magnet, the suspending force is small compared to the size of the apparatus.

The conventional suspension apparatus utilizing the pinning effect has the problem that the costs of the suspension apparatus increase because the permanent magnet is needed to obtain the suspending force, as in the suspension apparatus utilizing the Meissner effect. When the high temperature superconductor is disposed on the movable part, it becomes difficult to cool the high temperature superconductor and to maintain a cooled state. Hence, the high temperature superconductor is sometimes disposed on the stationary part while the permanent magnet is disposed on the movable part. In such a case, since the mechanical strength of the permanent magnet is lower than that of other mechanical members, the overall strength of the movable part decreases.

Moreover, when the high temperature superconductor is combined with only the permanent magnet, the kinds of objects which can be suspended are limited. In addition, when the movable part must be moved over a wide range in the direction perpendicular to the direction of suspension, high temperature superconductors or permanent magnets, which are both expensive, must be arranged over the wide range.

An object of the present invention is to solve the above-described problems and to provide a magnetic suspension apparatus which can stably produce a strong suspending and supporting force, which is cheap and has an increased mechanical strength, and which can permit a higher degree of freedom in designing the apparatus.

In the apparatus according to the present invention, a superconductor is cooled in a magnetic field of a single direction, and pinning flux penetrates the superconductor from one surface to the opposite surface thereof. Since a ferromagnetic material is disposed on one surface of the superconductor, the pinning flux penetrating the ferromagnetic material via a gap reaches the opposite surface while making a long detour through the space around the superconductor, thereby making a opened magnetic circuit. As a result, the magnetic resistance of the entire magnetic circuit increases, and the number of lines of magnetic flux of the ferromagnetic material decreases due to the increase of the magnetic resistance of the ferromagnetic material, so that the magnetic attractive force and the restoring force decrease. Therefore, another object of the present invention is to provide a magnetic suspension apparatus which can be improved to overcome the above-described problems.

DISCLOSURE OF THE INVENTION

The magnetic suspension apparatus according to the present invention provides the following effects.

(A) Conventionally used permanent magnets can be omitted by arranging a ferromagnetic material on a stationary part or a movable part which faces a high temperature superconductor. Also, since a ferromagnetic material such as iron which is cheap and which can be easily machined can be disposed to face the high temperature superconductor, the costs of the suspension apparatus can be decreased while increasing the mechanical strength.

In addition, since it becomes unnecessary to consider the positions of the north and south magnetic poles, unlike the case of using a permanent magnet, the degree of freedom in designing the apparatus increases.

(B) Conventionally used permanent magnets can be omitted by arranging a ferromagnetic material on a stationary part or a movable part which faces a high temperature superconductor. Also, since a steel material such as iron or silicon steel which is cheap and strong and which can be easily machined can be disposed to face the high temperature superconductor, the costs of the suspension apparatus can be decreased while increasing the mechanical strength. In addition, since the magnetic resistance of the magnetic circuit can be decreased, the pinning magnetic flux can be effectively used to increase the suspending force and the restoring force.

BRIEF DESCRIPTION OF THE DRAWINGS

FIG. 1 is a sectional view of a magnetic suspension apparatus showing a first embodiment of the present invention;

FIG. 2 is a sectional view showing a structure for cooling the superconductor of the present invention in a magnetic field by using permanent magnets;

FIG. 9 is a perspective view of a magnetic suspension apparatus showing a forth embodiment of the present invention;

FIG. 10 is a perspective view of a magnetic suspension apparatus showing a fifth embodiment of the present invention;

BEST MODE FOR CARRYING OUT THE INVENTION

Figure 3:
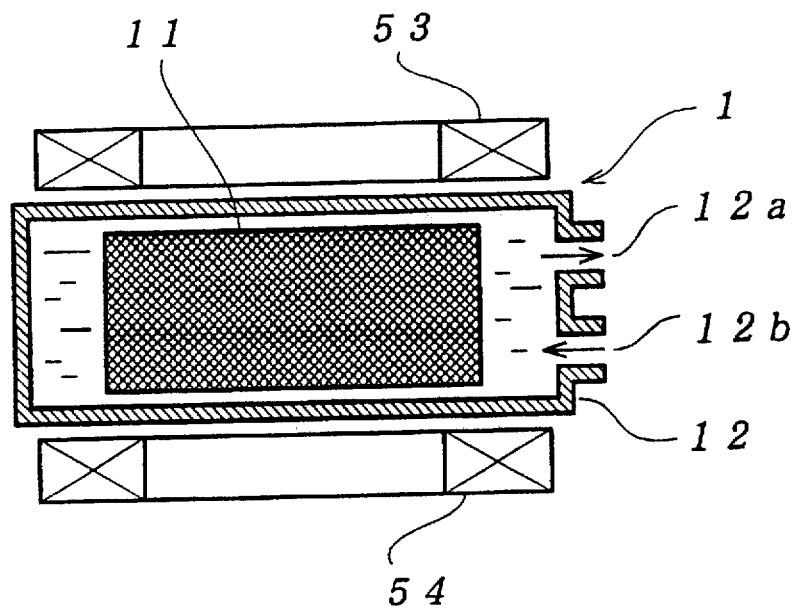
FIG. 3 is a sectional view showing a structure for cooling the superconductor of the present invention in a magnetic field by using electromagnets.

Embodiments of the present invention will now be described in detail with reference to the accompanying drawings.

FIG. 1 is a sectional view of a magnetic suspension apparatus showing a first embodiment of the present invention.

In FIG. 1, numeral 1 denotes a stationary part in which a high temperature superconductor 11 having a strong pinning force is enclosed in a cold reserving container 12. Numeral 2 denotes a movable part to be suspended which includes a ferromagnetic member 21 and a workpiece 22. The movable part 2 is disposed such that its surface area facing the high temperature superconductor 11 becomes smaller than the area of the region in the high temperature superconductor 11, in which region magnetic flux (not shown) is pinned.

The high temperature superconductor 11 is brought into a superconductive state by cooling the superconductor 11 in a magnetic field using the structure shown in FIG. 2. That is, permanent magnets 51 and 52 functioning as a magnetic field generating source are arranged above and below the cold reserving container 12 such that their poles are directed to produce an attractive force therebetween. After the stationary part 1 is disposed in such a manner, liquid nitrogen serving as a refrigerant is introduced into the cool reserving container 12 via a nitrogen inlet port 12b to cool the high temperature superconductor 11 to a temperature equal to or lower than the critical temperature, thereby performing cooling in a magnetic field. When the temperature of the high temperature superconductor 11 sufficiently decreases and the pinning of the unillustrated magnetic flux is completed, at least the permanent magnet 52 which is located on the side on which the movable part (see FIG. 1) will be situated is removed. Subsequently, the movable part is disposed at a predetermined position.

In FIG. 2, the permanent magnets 51 and 52 are disposed outside the cold reserving container 12. However, in cases in which the magnetic characteristics of the magnets 51 and 52 do not greatly change even at the cooling temperature, the permanent magnets 51 and 52 may be arranged inside the cold reserving container 12. This structure facilitates the cooling of the high temperature superconductor 11 in a magnetic field and simplifies the magnetic suspension apparatus of the present invention.

Also, by leaving the permanent magnet 51 on the side opposite to the side on which the movable part exists, the decrease in the pinned magnetic flux can be suppressed, which decrease would occur when the permanent magnet 52 is removed after cooling. In this case, the magnetic attractive force produced between the high temperature superconductor 11 and the ferromagnetic member 21 also increases, and the tendency for the magnetic attractive force to decrease when the gap becomes equal to or less than a predetermined amount becomes stronger.

Instead of the permanent magnets 51 and 52, electromagnets may be used, as shown in FIG. 3. That is, electromagnets 53 and 54 functioning as a magnetic field generating source are arranged above and below the cold reserving container 12 containing the high temperature superconductor 11. In the stationary part 1, a predetermined amount of current is supplied to the electromagnets 53 and 54 in advance such that the magnetic fields generated by the electromagnets 53 and 54 strengthen each other. By introducing liquid nitrogen serving as a refrigerant into the cool reserving container 12 via the nitrogen inlet port 12b, the high temperature superconductor 11 is cooled to a temperature equal to or lower than the critical temperature, thereby performing cooling in a magnetic field. When the temperature of the high temperature superconductor 11 sufficiently decreases and the pinning of the unillustrated magnetic flux is completed, the supply of current to the electromagnets 53 and 54 is stopped. Alternatively, after the high temperature superconductor 11 is sufficiently cooled, a predetermined amount of current is supplied to the electromagnets 53 and 54 for a short period of time to pin the magnet flux.

In this case, the movable part 2 including the ferromagnetic member 21 may be disposed after the high temperature superconductor 11 is cooled in a magnetic field. Alternatively, the movable part 2 may be situated at a predetermined position before the cooling if the movable part 2 can be fixed during the cooling, and therefore there is no possibility that the movable part 2 encounters the cold reserving container 12 due to the magnetic attractive force generated by the electromagnets 53 and 54.

Although two electromagnets 53 and 54 are disposed outside the cold reserving container 12 in FIG. 3, an electromagnet may be disposed inside the cold reserving container 12 to surround the high temperature superconductor 11 when the Joule heat generated on the supply of current does not cause a problem. In this case, only one electromagnet is required.

Also, by continuing the supply of current to at least one of the electromagnets 53 and 54, the decrease in the pinned magnetic flux can be suppressed, which reduction would occur when the permanent magnet 52 is removed after cooling. In this case, the magnetic attractive force produced between the high temperature superconductor 11 and the movable part 2 also increases, and the tendency for the magnetic attractive force to decrease when the gap becomes equal to or less than a predetermined amount becomes stronger.

The gap and the suspending force is controlled by feedback control in which a predetermined amount of current is supplied to the electromagnets 53 and 54. That is, when the gap between the high temperature superconductor 11 and the movable part 2, which has been suspended after the cooling of the superconductor 11, exceeds a predetermined upper limit due to an increase in the load acting on the movable part or a disturbance, the amount of current is adjusted such that the pinned magnet flux increases. When the gap becomes lower than a predetermined lower limit due to a decrease in the load of the movable part or a disturbance, the amount of current is adjusted such that the pinned magnet flux decreases. The superconductive state is maintained by replenishing the cool reserving container 12 with liquid nitrogen after the high temperature superconductor 11 is cooled in a magnetic field. Nitrogen gas which is generated due to heat inversion from the outside and various losses in the high temperature superconductor 11 is discharged from a nitrogen discharge outlet 12a.

The magnetic flux pinned to the high temperature superconductor 11 of the stationary part 1 penetrates the ferromagnetic member 21, thereby generating a magnetic attractive force. As a result, the magnetic attractive force and the gravity acting on the movable part 2 are balanced with each other so that the movable part 2 is stably suspended from the stationary part 1 with a predetermined gap.

The operation of the first embodiment of the present invention will now be described.

FIG. 4(a) through 4(d) are schematic explanatory charts showing the operation of the first embodiment of the present invention. These enlarged drawings show the gap between the high temperature superconductor 11 and the ferromagnetic member 21 shown in FIG. 1. The cold reserving container 12 and the refrigerant are not shown. FIG. 4(a) schematically illustrates the distribution of the pinned magnetic flux 3 of the high temperature superconductor 11 after cooling in a magnetic field in which the ferromagnetic member 21 does not exist. When the ferromagnetic member 21 approaches the high temperature superconductor 11, as shown in FIG. 4(b), the magnetic flux 3 concentrates to pass through the ferromagnetic member 21 because the permeability of the ferromagnetic member 21 is considerably higher than that of the space around the ferromagnetic member 21. As a result, a magnetic attractive force is generated between the high temperature superconductor 11 and the ferromagnetic member 21 in a well known manner.

When the ferromagnetic member 21 further approaches the high temperature superconductor 11, as shown in FIG. 4(c), the amount of the magnetic flux 3 concentrated in the ferromagnetic member 21 increases so that the magnetic flux density at the gap increases and the magnetic attractive force increases accordingly.

Usually, the increase in the magnetic attractive force causes the approach of the ferromagnetic member 21 to the high temperature superconductor 11, and this approach causes a further increase in the magnetic attractive force. Due to this vicious circle, the ferromagnetic member 21 contacts the high temperature superconductor 11. Accordingly, it becomes difficult to levitate and support the ferromagnetic member 21 with a predetermined gap.

In the present embodiment, such a vicious circle is broken by employing the structure in which the portion of the ferromagnetic member 21 facing the high temperature superconductor 11 has an area smaller than the region of the high temperature superconductor 11, in which region the magnetic flux is pinned.

In detail, when the area of the ferromagnetic member 21 facing the high temperature superconductor 11 is small, the magnetic flux 3 flowing into the ferromagnetic member 21 is greatly distorted at the gap, as shown in FIGS. 4(a)–4(d).

The distortion must become larger when the gap decreases. However, since the magnetic flux does not bend greatly, the magnetic flux 3 tends to move within the high temperature superconductor 11 in a direction toward the location where the magnetic flux 3 concentrates.

Figure 4:
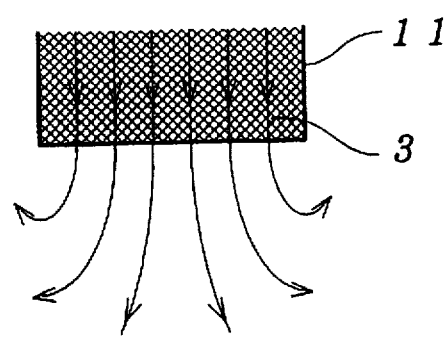
FIG. 4(a) through 4(d) are schematic explanatory charts showing the operation of the first embodiment of the present invention.
Figure 4:
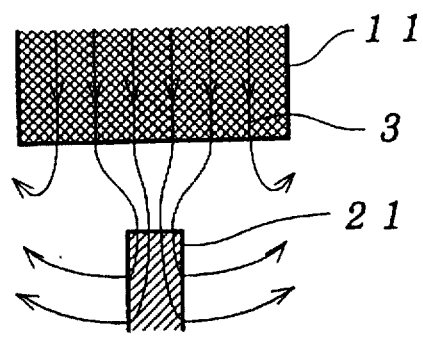
Figure 4:
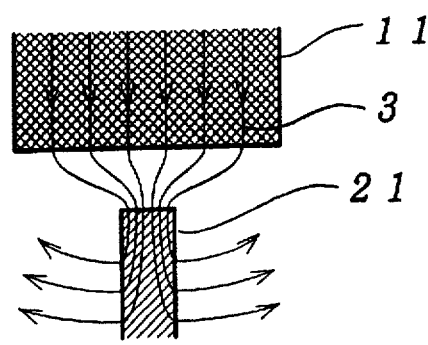
Figure 4:
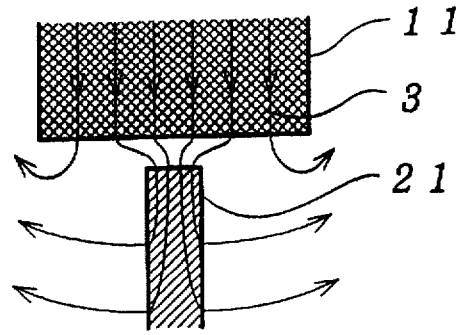

Since the pinning force of the high temperature superconductor 11 acts on the magnetic flux 3, the magnetic flux 3 cannot move when the pinning force is greater than the force of movement of the magnetic flux 3. As a result, the concentration of the magnetic flux 3 into the ferromagnetic member 21 cannot be maintained at locations where lines of the magnetic flux must bend excessively. In other words, when the gap becomes smaller than a predetermined value, part of the concentrated magnetic flux 3 does not pass through the upper end surface of the ferromagnetic member 21, so that the magnetic flux density at the gap decreases, as shown in FIG. 4 (d).

Accordingly, the magnetic attraction force produced between the high temperature superconductor 11 and the ferromagnetic member 21 decreases. By utilizing this phenomenon, the movable part 2 can be stably held in a non-contacting manner.

Figure 5:
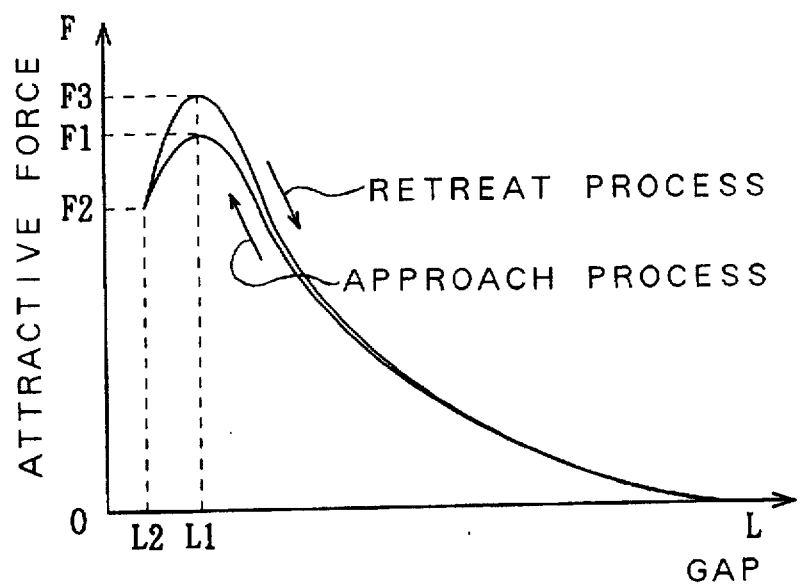
FIG. 5 is a characteristic chart showing the relationship between the size of the gap and the magnetic attractive force in the magnetic suspension apparatus according to the first embodiment of the present invention.

FIG. 5 is a characteristic chart showing variations in the magnetic attractive force when the ferromagnetic member is caused to approach the high temperature superconductor and when the ferromagnetic member is caused to retreat or separate from the high temperature superconductor in the magnetic suspension apparatus according to the first embodiment of the present invention. The high temperature superconductor is cooled in a magnetic field in advance.

As shown in FIG. 5, when the ferromagnetic member 21 approaches the high temperature superconductor 11, the magnetic attractive force increases to F1, and then decreases to F2 after the gap becomes smaller than L1. During the approach process of the ferromagnetic member 21, the pinning position of the magnetic flux 3 changes slightly. As a result, a hysteresis is produced when the ferromagnetic member 21 retreats or separates from the high temperature superconductor 11. That is, when the gap increases from L2 to L1, the magnetic attractive force increases from F2 to F3. When the gap exceeds L1, the magnetic attractive force decreases while following the curve indicating the approach process.

When FIG. 5 is compared with FIGS. 4(a)-4(d), the section of the curve of FIG. 5 in which no magnetic attractive force is generated due to a large gap corresponds to FIG. 4(a), and the section of the curve in which the magnetic attractive force is generated and increases until the gap becomes L1 corresponds to FIGS. 4(b) and 4(c). The section of the curve in which the magnetic attractive force decreases when the gap varies between L1 and L2 corresponds to FIG. 4(d). As is apparent from FIG. 5, when a ferromagnetic member 21 having a weight corresponding to a magnetic attractive force in the range of F2-F1 or the range of F2-F3 is brought beneath the high temperature superconductor 11, which has been cooled in a magnetic field, at a position where the gap falls within the range of L1-L2, the magnetic attractive force and the gravity are balanced with each other, so that the ferromagnetic member 21 can be stably suspended in a non-contacting manner. The ferromagnetic member in the present embodiment may have various shapes.

Figure 6:
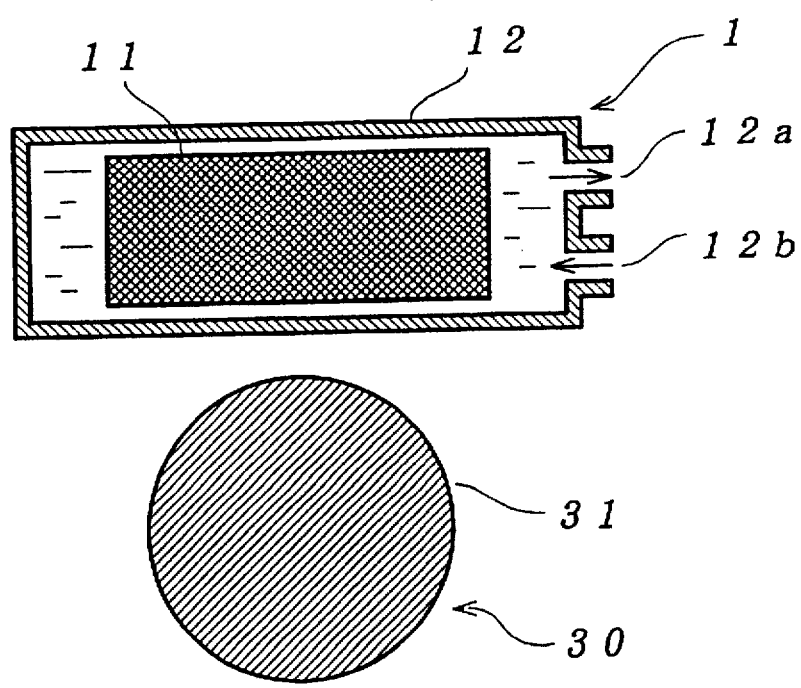
FIG. 6 is a sectional view of a magnetic suspension apparatus showing a second embodiment of the present invention.

FIG. 6 is a sectional view of a magnetic suspension apparatus showing a second embodiment of the present invention. In the present embodiment, a stationary part 1 has the same structure as in the first embodiment. A movable part 30 is formed by a ferromagnetic member 31 having a spherical shape. The superconductive state is produced and maintained by cooling in a magnetic field in a manner similar to that used in the first embodiment.

The magnetic flux pinned to the high temperature superconductor 11 of the stationary part 1 penetrates the spherical ferromagnetic member 31, thereby generating a magnetic attractive force. As a result, the magnetic attractive force and the gravity acting on the movable part 30 are balanced with each other so that the movable part 30 is stably suspended from the stationary part 1 with a predetermined gap. The spherical surface of the movable part 30 is equivalent to a small surface facing the high temperature superconductor 11. Therefore, the pinned magnetic flux is concentrated and is compulsorily distorted in the gap, like in the first embodiment, so that the magnetic attractive force decreases when the gap becomes lower than a predetermined amount, thereby stabilizing the suspending operation.

Since the ferromagnetic member 31 forming the movable part 30 is spherical and does not have a magnetic pole, unlike permanent magnets, the movable part 30 can be rotated in an arbitrary direction around the center thereof.

Figure 7:
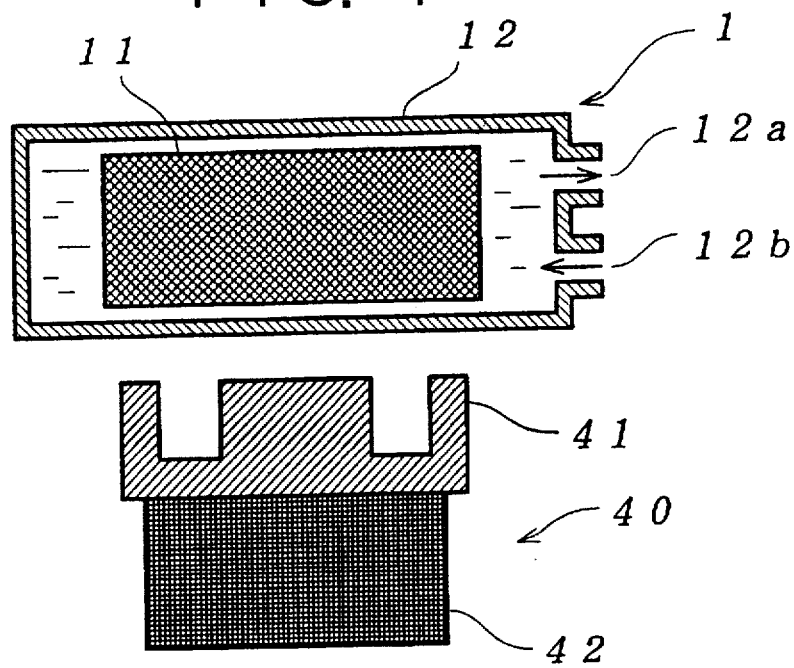
FIG. 7 is a sectional view of a magnetic suspension apparatus showing a third embodiment of the present invention.

FIG. 7 is a sectional view of a magnetic suspension apparatus showing a third embodiment of the present invention.

In the present embodiment, a stationary part 1 has the same structure as in the first and second embodiments. A movable part 40 is formed by a ferromagnetic member 41 and a workpiece 42. The ferromagnetic member 41 has three tooth portions which face the high temperature superconductor 11. The superconductive state is produced and maintained by cooling in a magnetic field in a manner similar to that used in the first embodiment.

The magnetic flux pinned to the high temperature superconductor 11 of the stationary part 1 penetrates the spherical ferromagnetic member 41, thereby generating a magnetic attractive force. As a result, the magnetic attractive force and the gravity acting on the movable part 40 are balanced with each other so that the movable part 40 is stably suspended from the stationary part 1 with a predetermined gap.

The operation of the third embodiment of the present invention will now be described.

Figure 8:
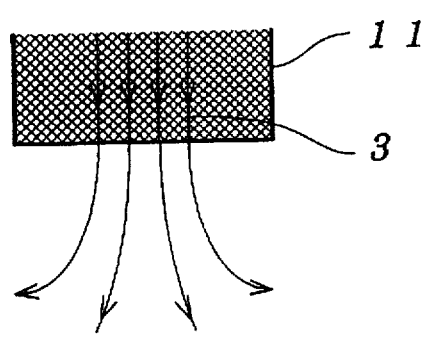
FIG. 8(a) through 8(d) are schematic explanatory charts showing the operation of the third embodiment of the present invention.
Figure 8:
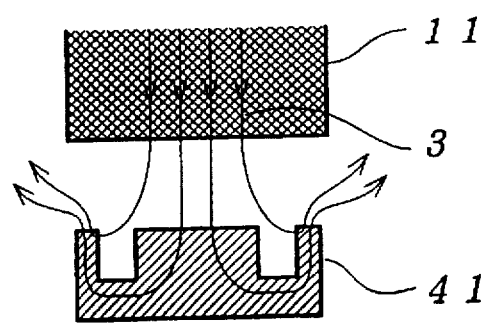
Figure 8:
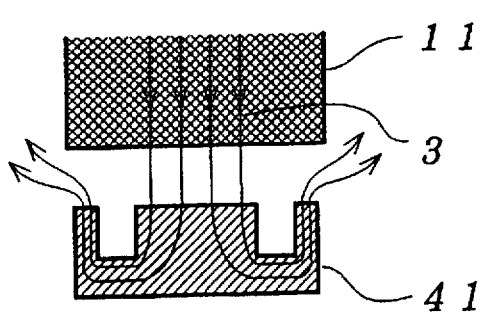
Figure 8:
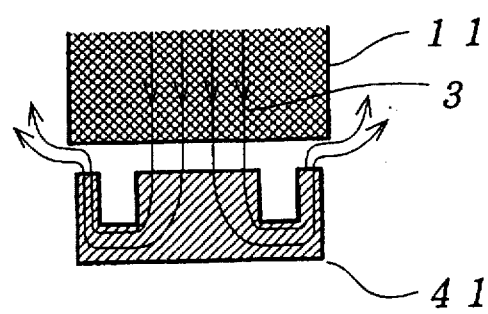

FIG. 8(a) through 8(d) are schematic explanatory charts showing the operation of the third embodiment of the present invention. These enlarged drawings show the gap between the high temperature superconductor 11 and the ferromagnetic member 41 shown in FIG. 7. The cold reserving container 12 and the refrigerant are not shown. FIG. 8(a) schematically illustrates the distribution of the pinned magnetic flux 3 of the high temperature superconductor 11 after cooling in a magnetic field in which the ferromagnetic member 41 does not exist.

When the ferromagnetic member 41 approaches the high temperature superconductor 11, as shown in FIG. 8(b), the magnetic flux 3 concentrates to pass through the ferromagnetic member 41 because the permeability of the ferromagnetic member 41 is considerably higher than that of the space around the ferromagnetic member 41. As a result, a magnetic attractive force is generated between the high temperature superconductor 11 and the ferromagnetic member 41 in a well known manner. When the ferromagnetic member 41 further approaches the high temperature superconductor 11, as shown in FIG. 8(c), the amount of the magnetic flux 3 concentrated in the ferromagnetic member 41 increases so that the magnetic flux density at the gap increases and the magnetic attractive force increases accordingly.

At this time, in the present embodiment, the magnetic flux at the central portion of the high temperature superconductor 11 flows from the area in which the magnetic flux is pinned to the center tooth portion of the ferromagnetic member 41 via the gap. The magnetic flux then flows through two side tooth portions and the gap to areas at which the magnetic flux 3 of the high temperature superconductor 11 is not pinned. A part of the bypassed magnetic flux is repulsed by the diamagnetism of the high temperature superconductor 11. When the gap becomes smaller than a predetermined value, the repulsive force becomes strong so that the magnetic attractive force produced between the high temperature superconductor 11 and the ferromagnetic member 41 decreases. Owing to this effect, the magnetic attractive force and the gravity are balanced to stably suspend the ferromagnetic member 41 in a non-contacting manner.

FIG. 9 is a perspective view of a magnetic suspension apparatus showing a fourth embodiment of the present invention.

As shown in FIG. 9, a stationary part 100 is mainly formed by a superconductor 101 having a strong pinning force, two permanent magnets 102a and 102b, and a back yoke 103. A movable part 110 to be suspended is formed by a pair of circular layered ferromagnetic members 111a and 111b made of silicon steel plates or the like, and a bar-like ferromagnetic member 112. A cold reserving container, and a drive mechanism for rotating the movable part 110 are not shown. The magnetic flux flows through the permanent magnet 102a, the back yoke 103, the permanent magnet 102b and the superconductor 101, and then enters the movable part 110 via a gap. The magnetic flux then passes through the circular layered ferromagnetic member 111b, the bar-like ferromagnetic member 112 and the circular layered ferromagnetic member 111a, and then enters the stationary part 110 via the gap to pass through the superconductor 101, thereby completing a magnetic closed loop.

The thickness of the circular layered ferromagnetic members 111a and 111b is determined such that the portions of the circular layered ferromagnetic members 111a and 111b which face the superconductor 101 have areas smaller than the areas of the regions in the superconductor 101 where the magnetic flux (not shown) is pinned.

With this structure, the movable part 110 is stably suspended with a predetermined gap while being allowed to rotate. Accordingly, a magnetic bearing can easily be constructed by combining a rotary drive mechanism such as a motor with the suspension apparatus of the present embodiment. Since the magnetic path is closed, the magnetic flux density at the gap becomes higher so that the suspending force can be increased and the stability of the suspending operation can be improved.

Although the circular layered ferromagnetic members 111a and 111b are used in the movable part 110 to increase its permeability, thereby reducing the loss due to eddy current, a circular plate cut out of a steel ingot may be used in the case where the rotational speed is low and therefore the generation of eddy current can be ignored, or in the case where a high permeability is not needed.

Although the magnetic bearing according to the present embodiment may be used singly, it may be used in combination to obtain a magnetic bearing having a stronger suspending force or a longer magnetic bearing.

In the present embodiment, a single magnet assembly including two permanent magnets 102a and 102b and a back yoke 103 is arranged right above the superconductor 101 to reduce the leakage of magnetic flux, and to increase the suspending force and the suspending stability. A plurality of such magnetic assemblies may be provided. Also, such a magnetic assembly may be formed by a single permanent magnet and a pair of yokes contacting the superconductor 101. All of the permanent magnets 102a and 102b and the back yoke 103 may be omitted. Alternatively, the back yoke 103 or the permanent magnets 102a and 102b may be omitted.

FIG. 10 is a perspective view of a magnetic suspension apparatus showing a fifth embodiment of the present invention which is applied to a magnetically suspended carrier.

As shown in FIG. 10, a stationary part 120 is mainly formed by a rail-shaped ferromagnetic member 121 having two tooth portions on the lower side. A movable part 130 to be suspended is formed by a rectangular parallelepipedonal superconductor 131 having a strong pinning force. The magnetic flux flows through the superconductor 131 and enters the stationary part 120 via a gap. The magnetic flux then flows through the rail-shaped ferromagnetic member 121, and enters the movable part 130 via another gap to pass through the superconductor 131, thereby completing a magnetically closed loop. A cold reserving container, a workpiece to be transported, and a drive mechanism are not shown in FIG. 10.

Figure 11:
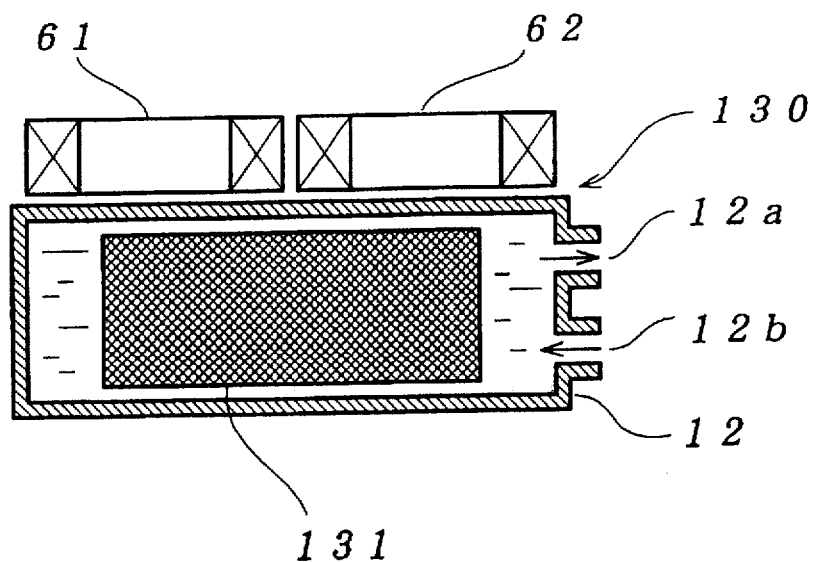
FIG. 11 is a sectional view showing a structure for cooling the superconductor of the magnetic suspension apparatus according to the fifth embodiment of the present invention in a magnetic field by using electromagnets.

The high temperature superconductor 131 is brought into a superconductive state by cooling the superconductor 131 in a magnetic field using a mechanism shown in FIG. 11. That is, electromagnets 61 and 62 serving as a magnetic field generating source are arranged above a cold reserving container 12 in which the high temperature superconductor 131 is enclosed. In the movable part 130, a predetermined amount of current is supplied to the electromagnets 61 and 62 in advance such that the magnetic fields generated by the electromagnets 62 and 61 strengthen each other. By introducing liquid nitrogen serving as a refrigerant into the cool reserving container 12 via the nitrogen inlet port 12b, the high temperature superconductor 131 is cooled to a temperature equal to or lower than the critical temperature, thereby performing cooling in a magnetic field. When the temperature of the high temperature superconductor 131 sufficiently decreases and the pinning of the unillustrated magnetic flux is completed, the supply of current to the electromagnets 61 and 62 is stopped. Alternatively, after the high temperature superconductor 131 is sufficiently cooled, a predetermined amount of current is supplied to the electromagnets 61 and 62 for a short period of time to pin the magnet flux.

The thickness of each tooth portion of the rail-shaped ferromagnetic members 121 is determined such that the area of the tip of each tooth portion which faces the superconductor 131 becomes smaller than the area of the region in the superconductor 131 where the magnetic flux (not shown) is pinned.

With this structure, the movable part 130 is stably suspended with a predetermined gap while being allowed to be moved in the longitudinal direction of the rail-shaped ferromagnetic member 121. Accordingly, a magnetically suspended carrier can easily be constructed by combining a drive mechanism and a work supporter with the suspension apparatus of the present embodiment.

When the movable part 130 moves at a high speed, the permeability of the stationary part 120, especially the permeability of the rail-shaped ferromagnetic member 121 must be increased to reduce the loss due to eddy current. In such a case, the whole or the tooth portions of the rail-shaped ferromagnetic member 121 may be formed by layered silicon steel plates.

Although the magnetic suspension apparatus according to the present embodiment may be used singly, it may be used in combination to obtain a magnetic suspension apparatus having a stronger suspending force or a longer magnetic suspension apparatus.

Needless to say, the magnetic suspending apparatus formed by a high temperature superconductor and a ferromagnetic member can be combined with an ordinary magnetic suspending apparatus which is formed by the combination of an electromagnet and a ferromagnetic member, the combination of an electromagnet and a permanent magnet, the combination of a high temperature superconductor and a permanent magnet, or the combination of a high temperature superconductor and an electromagnet to simplify the control of the entire apparatus and to enhance the performance thereof.

Figure 12:
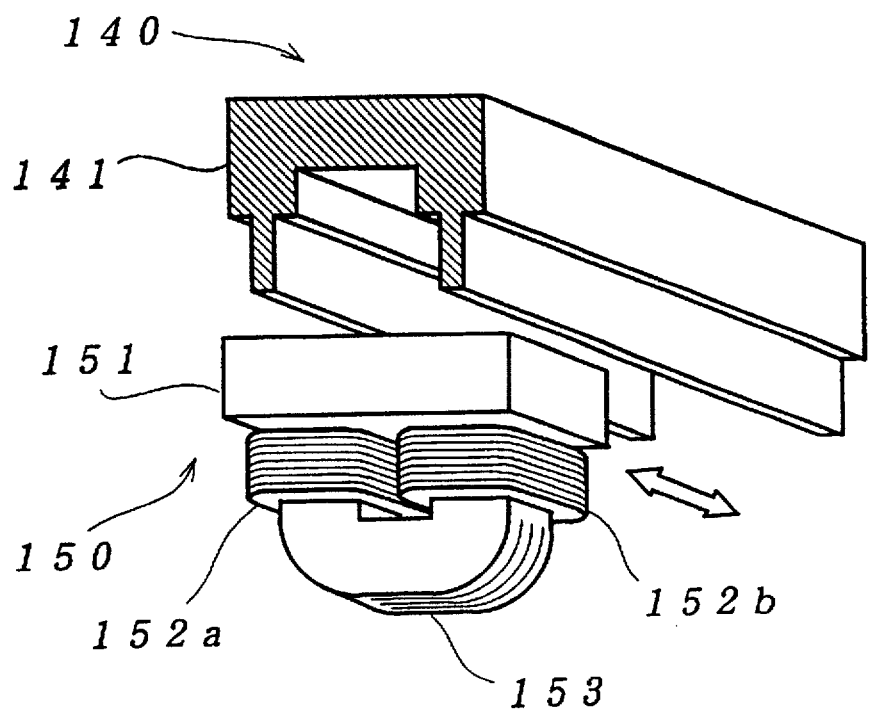
FIG. 12 is a perspective view of a magnetic suspension apparatus showing a sixth embodiment of the present invention.

FIG. 12 is a perspective view of a magnetic suspension apparatus showing a sixth embodiment of the present invention which is applied to a magnetically suspended carrier.

As shown in FIG. 12, a stationary part 140 is mainly formed by a rail-shaped ferromagnetic member 121 having two tooth portions on the lower side. A movable part 150 to be suspended is formed by a superconductor 151 having a strong pinning force, two electromagnets 152a and 152b, and a layered yoke 153. The electromagnets 152a and 152b are part of a magnetic field generating source which have been used to cool the high temperature superconductor 151 in a magnetic field.

The magnetic flux flows through the electromagnet 152a, the layered yoke 153, the electromagnet 152b, the superconductor 151 and enters the stationary part 140 via a gap. The magnetic flux then flows through the rail-shaped ferromagnetic member 141, and enters the movable part 150 via another gap to pass through the superconductor 151, thereby completing a magnetically closed loop. A cold reserving container, a workpiece to be transported, and a drive mechanism are not shown. The thickness of each tooth portion of the rail-shaped ferromagnetic members 141 is determined such that the area of the tip of each tooth portion which faces the superconductor 151 becomes smaller than the area of the region in the superconductor 151 where the magnetic flux (not shown) is pinned.

The pinned magnetic flux of the superconductor 151 can be prevented from decreasing by continuing the supply of current to the electromagnets 152a and 152b in the state in which the movable part 150 is being suspended after the superconductor 151 is cooled in a magnetic field. In this case, the magnetic attractive force produced between the superconductor 151 and the rail-shaped ferromagnetic member 141 becomes larger so that the restoring force is increased. Namely, the tendency becomes stronger in which the attractive force decreases due to the concentration of the magnetic flux when the gap becomes lower than a predetermined value.

Also, the amount of the magnetic flux pinned to the superconductor 151 can be increased and decreased by instantaneously supplying current to the electromagnets 152a and 152b. That is, while the movable part 150 is being suspended, current is instantaneously supplied to the electromagnets 152a and 152b such that a magnetic field is generated in a direction same as or opposite to the direction of the pinned magnetic field which is currently pinned to the superconductor 151 and that the generated magnetic field becomes stronger than the lower critical magnetic field of the superconductor 151. The increase and decrease in the amount of the pinned magnetic flux affect the magnetic attractive force between the superconductor 151 and the rail-shaped ferromagnetic member 141 and the restoring force which occurs due to the concentration of the magnetic flux.

With this structure, the movable part 150 is stably suspended with a predetermined gap while being allowed to be moved in the longitudinal direction of the rail-shaped ferromagnetic member 141. Also, the force for suspending the movable part 150 and the gap can be freely controlled. Accordingly, a magnetically suspended carrier can easily be constructed by combining a drive mechanism and a work supporter with the suspension apparatus of the present embodiment.

When the movable part 150 moves at a high speed, the permeability of the stationary part 140, especially the permeability of the rail-shaped ferromagnetic member 141 must be increased to reduce the loss due to eddy current. In such a case, the whole or the tooth portions of the rail-shaped ferromagnetic member 141 may be formed by layered silicon steel plates.

Although the magnetic suspension apparatus according to the present embodiment may be used singly, it may be used in combination to obtain a magnetic suspension apparatus having a stronger suspending force or a longer magnetic suspension apparatus.

In the present embodiment, a single magnet assembly including two permanent magnets 152a and 152b and a back yoke 153 is arranged right below the superconductor 151 to reduce the leakage of magnetic flux, and to increase the suspending force and the suspending stability. A plurality of such magnet assemblies may be provided. Also, the magnet assembly may be formed by a single electromagnet and a U-shaped yoke. Also, it is possible to arrange the electromagnets 152a and 152b only while omitting the layered yoke 153.

In the present embodiment, the magnetic circuit is formed such that the magnetic flux penetrates the rail-shaped ferromagnetic member 141 in the widthwise direction thereof. However, the magnetic circuit may be modified such that the electromagnets 152a and 152b are arranged in the longitudinal direction of the rail-shaped ferromagnetic member 141. In this case, only one tooth portion is provided on the rail-shaped ferromagnetic member 141.

Figure 13:
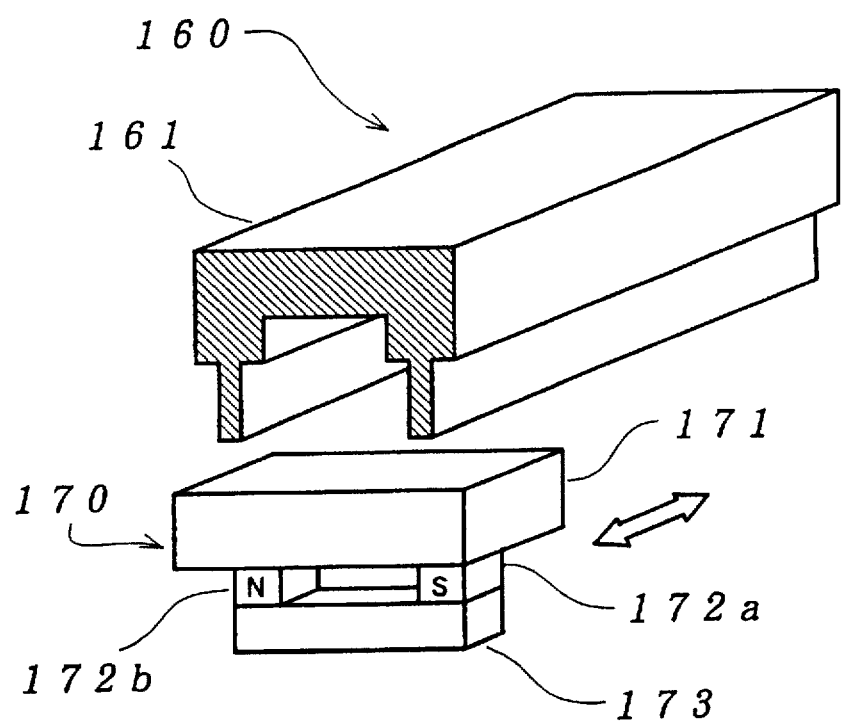
FIG. 13 is a perspective view of a magnetic suspension apparatus showing a seventh embodiment of the present invention.

FIG. 13 is a perspective view of a magnetic suspension apparatus showing a seventh embodiment of the present invention which is applied to a magnetic suspension apparatus. The present embodiment is obtained by adding a permanent magnet assembly to the fifth embodiment. The permanent magnet assembly includes two permanent magnets 172a and 172b provided on the side of the superconductor 171 opposite to the side facing the gap, and a back yoke 173. The magnetic flux passes through the permanent magnet 172b, the back yoke 173, the permanent magnet 172a and the superconductor 171, and then enters a stationary part 160 via a gap. The magnetic flux then passes through a rail-shaped ferromagnetic member 161, and enters the movable part 170 via another gap to pass through the superconductor 171, thereby completing a magnetically closed loop.

With this structure, the leakage of magnetic flux can be decreased, and the suspending force and the suspending stability can be increased. Although a single magnet assembly including two permanent magnets 172a and 172b and a back yoke 173 is arranged right under the superconductor 171, a plurality of magnet assemblies may be provided. The magnet assembly may be formed by the combination of a single permanent magnet having a plurality of poles formed in one face thereof and a single back yoke, or the combination of a single permanent magnet and a pair of yokes contacting the superconductor 171. Also, these components may be omitted, or only the back yoke 173 may be provided.

In the present embodiment, the magnetic circuit is formed such that the magnetic flux penetrates the rail-shaped ferromagnetic member 161 in the widthwise direction thereof. However, the magnetic circuit may be modified such that the permanent magnets 172a and 172b are arranged in the longitudinal direction of the rail-shaped ferromagnetic member 161. In this case, only one tooth portion is provided on the rail-shaped ferromagnetic member 161.

Figure 14:
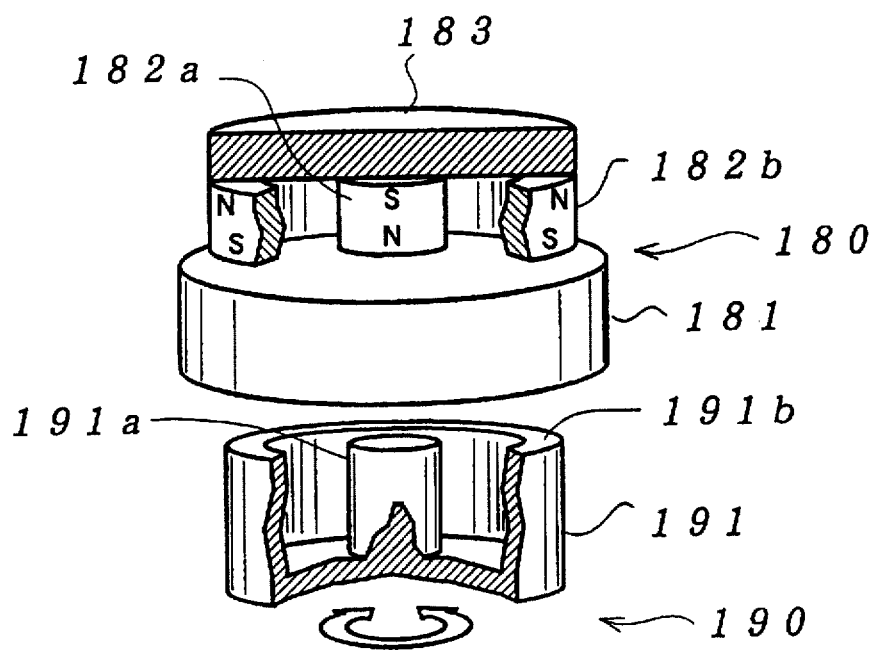
FIG. 14 is a partially sectioned perspective view of a magnetic suspension apparatus showing an eighth embodiment of the present invention.

FIG. 14 is a partially sectioned perspective view of a magnetic suspension apparatus showing an eighth embodiment of the present invention which is applied to a magnetic bearing.

As shown in FIG. 14, a stationary part 180 is mainly formed by a circular superconductor 181 having a strong pinning force, a cylindrical permanent magnet 182a which has been axially polarized, an annular permanent magnet 182b, and a back yoke 183. A movable part 190 is mainly formed by a cup-shaped ferromagnetic member 191 having a cylindrical projection at its center. A cold reserving container, a rotary drive mechanism and a shaft are not shown. The magnetic flux passes through the cylindrical permanent magnet 182a, the superconductor 181, and enters the center projection 191a of the cup-shaped ferromagnetic member 191 via a gap. The magnetic flux then passes through the outer circumferential portion 191b of the ferromagnetic member 191, and enters the superconductor 181 via the gap. After that, the magnetic flux passes through the annular permanent magnet 182b and the back yoke 183, thereby completing a magnetically closed loop.

The diameter of the projection 191a and the thickness of the outer circumferential portion 191b of the cup-shaped ferromagnetic member 191 are determined such that the areas of the portions which face the superconductor 181 become smaller than the areas of the regions in the superconductor 181 where the magnetic flux (not shown) is pinned.

With this structure, the movable part 190 is stably suspended with a predetermined gap while being allowed to rotate. Accordingly, a magnetic bearing can easily be constructed by combining a rotary drive mechanism such as a motor with the suspension apparatus of the present embodiment.

In the present embodiment, the movable part 190 does not cross the magnetic flux during the rotation, so that no eddy current flows within the cup-shaped ferromagnetic member 191. Accordingly, it is unnecessary to take measures such as the use of layered silicon steel plates to prevent the generation of eddy current.

Although the magnetic bearing according to the present embodiment can be used singly, the magnetic bearing may be arranged in a pair to support both ends of a rotary mechanism.

In the present embodiment, a single magnet assembly including two cylindrical permanent magnets 182a and 182b and a back yoke 183 is arranged right above the superconductor 181, the magnet assembly may be freely modified. For example, only the back yoke 183 may be used by omitting the cylindrical permanent magnets 182a and 182b used for the application of a bias. Also, the cylindrical permanent magnets 182a and 182b may be used by themselves.

In the present embodiment, the magnetic flux is concentrated at both the center projection 191a and the outer circumferential portion 191b of the cup-shaped ferromagnetic member 191. However, the shape of the ferromagnetic member 191 may be modified such that the concentration of the magnetic flux occurs at one of the center projection 191a and at the outer circumferential portion 191b and only an attractive force is produced at the other thereof.

Figure 15:
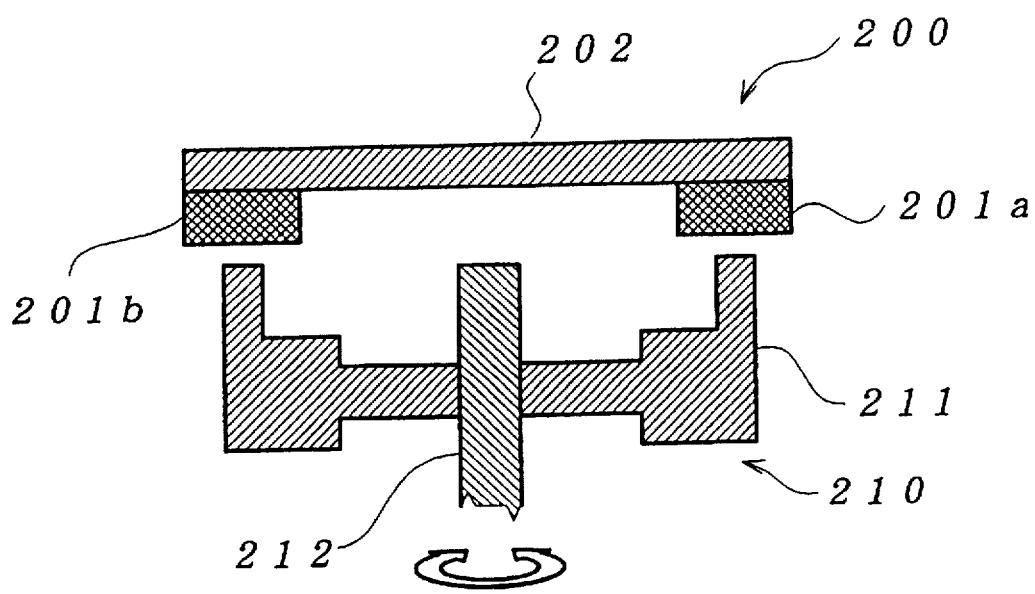
FIG. 15 is a sectional view of a magnetic suspension apparatus showing a ninth embodiment of the present invention.

FIG. 15 is a sectional view of a magnetic suspension apparatus showing a ninth embodiment of the present invention which is applied to a flywheel mechanism.

As shown in FIG. 15, a stationary part 200 is mainly formed by two block-shaped superconductors 201a and 201b, and a circular back yoke 202. A movable part 210 to be suspended is formed by a ferromagnetic member 211 functioning as a flywheel, and a shaft 212. A cold reserving container and a rotary drive mechanism are not shown. The magnetic flux passes through the superconductors 201a, and then enters the movable part 210 via a gap. The magnetic flux then flows through the ferromagnetic member 211, and enters the stationary part 200 via the gap to pass through the superconductor 201b and the back yoke 202, thereby completing a magnetically closed loop.

The thickness of the ferromagnetic member 211 is determined such that the areas of the portions which respectively face the superconductors 201a and 201b become smaller than the areas of the regions in the superconductors 201a and 201b where the magnetic flux (not shown) is pinned.

With this structure, the movable part 210 is stably suspended with a predetermined gap while being allowed to rotate. Accordingly, a flywheel integrated type magnetic bearing can easily be constructed by combining a rotary drive mechanism such as a motor with the suspension apparatus of the present embodiment.

In the present embodiment, the ferromagnetic member 211, which is a main component of the movable part 210, is formed as a single member from the viewpoint of the mechanical strength in the rotary direction. However, in the case where no problem exists in relation to the mechanical strength of the ferromagnetic member 211 but a problems exists in relation to eddy current which is generated when the ferromagnetic member 211 crosses the magnetic flux during the rotation, the part of the ferromagnetic member 211 which faces the superconductors 201a and 201b may be made of layered silicon steel plates or ferrite having a high specific resistance, as a separate member.

Although the magnetic bearing according to the present embodiment can be used singly, it may be used in combination to obtain a magnetic bearing having a stronger suspending force or a longer magnetic bearing.

Figure 16:
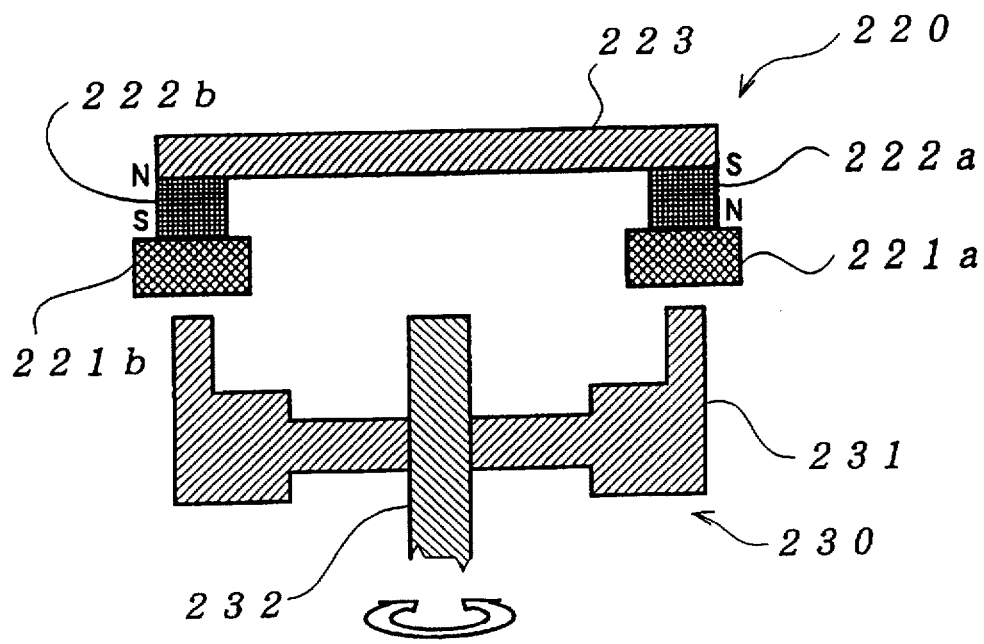
FIG. 16 is a sectional view of a magnetic suspension apparatus showing a tenth embodiment of the present invention.

FIG. 16 is a sectional view of a magnetic suspension apparatus showing a tenth embodiment of the present invention which is applied to a flywheel mechanism. The present embodiment can be obtained by adding permanent magnets to the superconductors of the ninth embodiment. That is, two cylindrical permanent magnets 222a and 222b and a back yoke 223 are coupled to block-shaped superconductors 221a and 221b. The magnetic flux passes through the cylindrical permanent magnet 222a and the block-shaped superconductors 221a, and then enters the movable part 230 via the gap. The magnetic flux then flows through the ferromagnetic member 231, and enters the stationary part 220 via a gap to pass through the block-shaped superconductor 221b and the back yoke 223, thereby completing a magnetically closed loop.

With this structure, the leakage of magnetic flux can be reduced, and the suspending force and the suspending stability can be increased. Although the two cylindrical permanent magnets 222a and 222b and the back yoke 223 are disposed just above the block-shaped superconductors 221a and 221b, this portion may freely be modified. For example, the cylindrical permanent magnets 222a and 222b are not necessarily to be cylindrical, and they may be prisms. Also, only the back yoke 223 may be used by omitting the cylindrical permanent magnets 222a and 222b used for the application of a bias. Also, the cylindrical permanent magnets 222a and 222b may be used by themselves.

In the present embodiment, two attractive force generating sections each of which is formed by a superconductor and a permanent magnet are used. However, three or more attractive force generating sections may be used.

Figure 17:
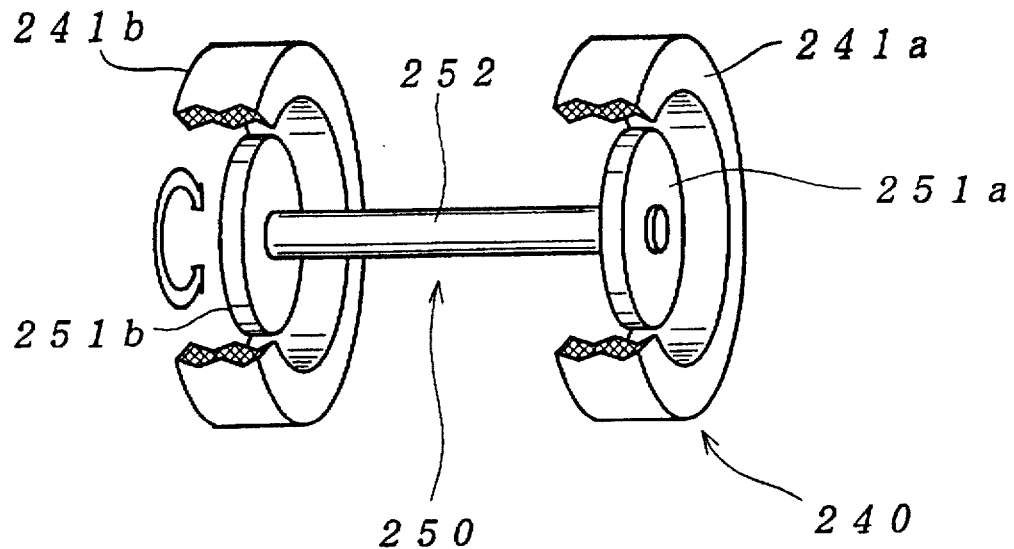
FIG. 17 is a partially sectioned perspective view of a magnetic suspension apparatus showing an eleventh embodiment of the present invention.

FIG. 17 is a partially sectioned perspective view of a magnetic suspension apparatus showing an eleventh embodiment of the present invention which is applied to a magnetic bearing used in a zero-gravity state such as in the outer space.

As shown in FIG. 17, a stationary part 240 is divided into two support sections having the same configuration. The support sections are formed by annular superconductors 241a and 241b each having a strong pinning force. A cold reserving container and a rotary drive mechanism are not shown. A movable part 250 to be suspended is formed by circular layered ferromagnetic members 251a and 251b made of silicon steel plates or the like, and a shaft 252. In the apparatus, a magnetically closed loop is formed via the gaps at the support sections thereof.

The thickness of the circular layered ferromagnetic members 251a and 251b is determined such that the areas of the portions which respectively face the superconductors 241a and 241b become smaller than the areas of the regions in the superconductors 241a and 241b where the magnetic flux (not shown) is pinned.

With this structure, the movable part 250 is stably suspended with a predetermined gap while being allowed to rotate. Accordingly, a magnetic bearing can easily be constructed by combining a rotary drive mechanism such as a motor with the suspension apparatus of the present embodiment.

In the movable part 250, the circular layered ferromagnetic members 251a and 251b are used to increase the permeability and eliminate the loss due to eddy current. However, when the rotational speed is low and therefore the generation of eddy current is ignorable, or when a high permeability is not required, circular plates cut out from a steel ingot may be used as the ferromagnetic members 251a and 251b.

Although the magnetic bearing according to the present embodiment can be used singly, it may be used in combination to obtain a magnetic bearing having a larger suspending force or a longer magnetic bearing.

Figure 18:
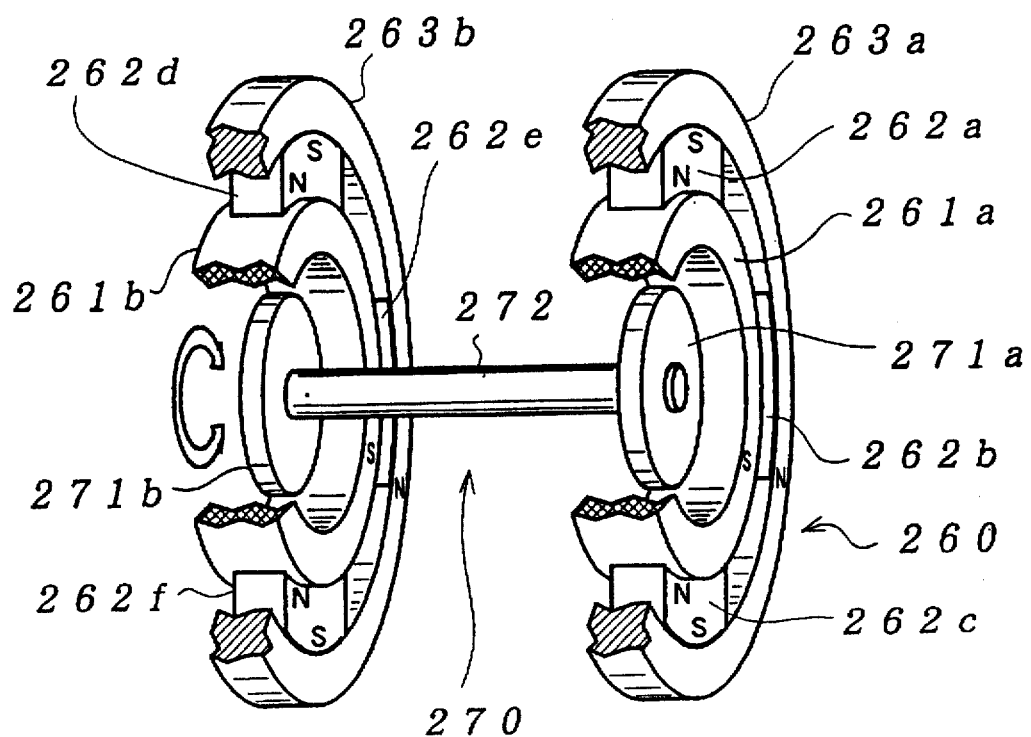
FIG. 18 is a partially sectioned perspective view of a magnetic suspension apparatus showing a twelfth embodiment of the present invention.

If the magnetic bearing according to the present invention is used such that the shaft 252 rotates about a vertical axis, the bearing can be used in an embodiment where the gravity acts on the movable part. Also, if the attractive force in the direction of the gravity is made smaller, the bearing can be used in a horizontal state shown in FIG. 17 even in environments where the gravity acts on the movable part. FIG. 18 is a partially sectioned perspective view of a magnetic suspension apparatus showing a twelfth embodiment of the present invention, which is obtained by adding permanent magnets to the eleventh embodiment. A stationary part 260 includes a plurality of permanent magnets 262a–262f which are disposed at constant intervals around the superconductors 261a and 261b, and back yokes 263a and 263b arranged outside the permanent magnets 262a–262f. Two permanent magnets situated at omitted portions at the front side in FIG. 18 are not shown. The magnetic flux forms a magnetically closed loop via the gaps formed at the support sections.

In the present embodiment, four permanent magnets are provided on the outer surface of each of the superconductors 261a and 261b. However, no limitation is imposed on the number of the permanent magnets.

In the present embodiment, to increase the suspending force and the suspending stability, the permanent magnets 262a to 262f for biasing and the back yokes 263a and 263b are provided in the stationary part 260. However, these components may be omitted. Also, the magnetic bearing may be constructed by using the back yokes 263a and 263b only, or the permanent magnets for biasing only.

Figure 19:
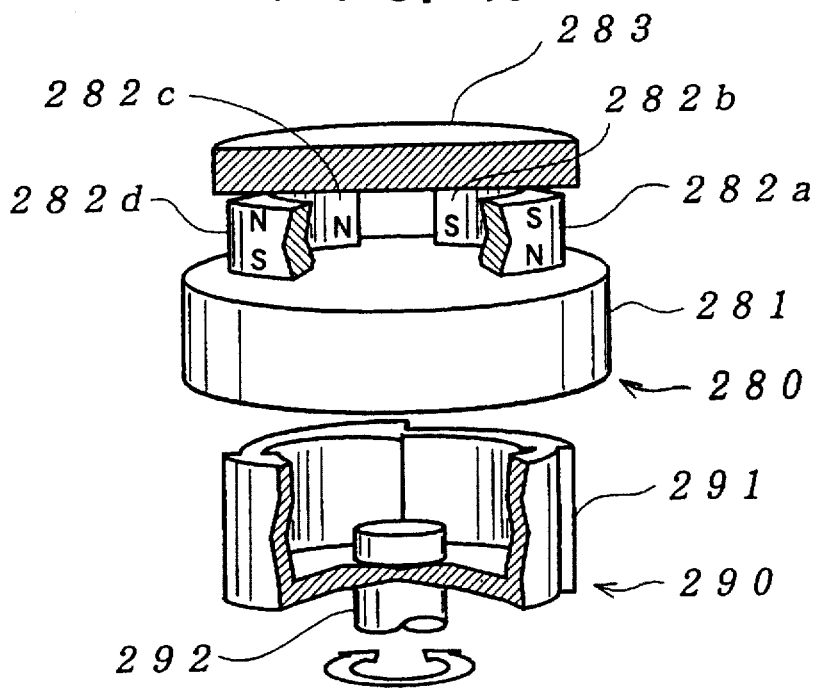
FIG. 19 is a partially sectioned perspective view of a magnetic suspension apparatus showing a thirteenth embodiment of the present invention.

FIG. 19 is a partially sectioned perspective view of a magnetic suspension apparatus showing a thirteenth embodiment of the present invention. This is an example of a suspension apparatus which has a mechanism for changing the force of suspending a movable part and the gap between the movable part and a stationary part.

As shown in FIG. 19, the stationary part 280 is mainly formed by a circular superconductor 281 having a strong pinning force, arcuate permanent magnets 282a–282d disposed on the circular superconductor 281 at constant intervals, and a circular back yoke 283. The movable part 290 to be suspended is formed by a cup-shaped ferromagnetic member 291, and a shaft 292. A cold reserving container and a rotary drive mechanism are not shown. A magnetically closed loop is formed via the gaps formed at the support sections.

The width of the upper end portion of the cup-shaped ferromagnetic member 291 is determined such that the area of the upper end portion which faces the superconductor 281 becomes smaller than the area of the region in the superconductor 281 where the magnetic flux (not shown) is pinned. Also, the width of the upper end portion continuously varies at a plurality of positions, the number of which is equal to the number of the arcuate permanent magnets 282a–282d.

Due to this structure, the width of the upper portion of the cup-shaped ferromagnetic member 291 right below the arcuate permanent magnets 282a–282d varies as the cup-shaped ferromagnetic member 291 rotates. Accordingly, the magnetic attractive force acting on the cup-shaped ferromagnetic member 291 and the degree of concentration of the magnetic flux vary. In other words, it is possible to change the force for suspending the movable part 290 and the gap during the suspension. Accordingly, by combining a rotary drive mechanism such as motor with the apparatus according to the present embodiment, it becomes possible to obtain a magnetic suspension apparatus which can change the suspending force and the gap during the suspension.

In the present embodiment, four arcuate permanent magnets are arranged right above the circular superconductor 281. However, the number of the arcuate permanent magnets is not limited to four.

In the present embodiment, to increase the suspending force and the suspending stability, the arcuate permanent magnets 282a to 282d for biasing and the circular back yoke 283 are provided in the stationary part 280. However, these components may be omitted. Also, the apparatus may be formed by using the circular back yoke 283 only, or the arcuate permanent magnets 282a–282d only.

Figure 20:
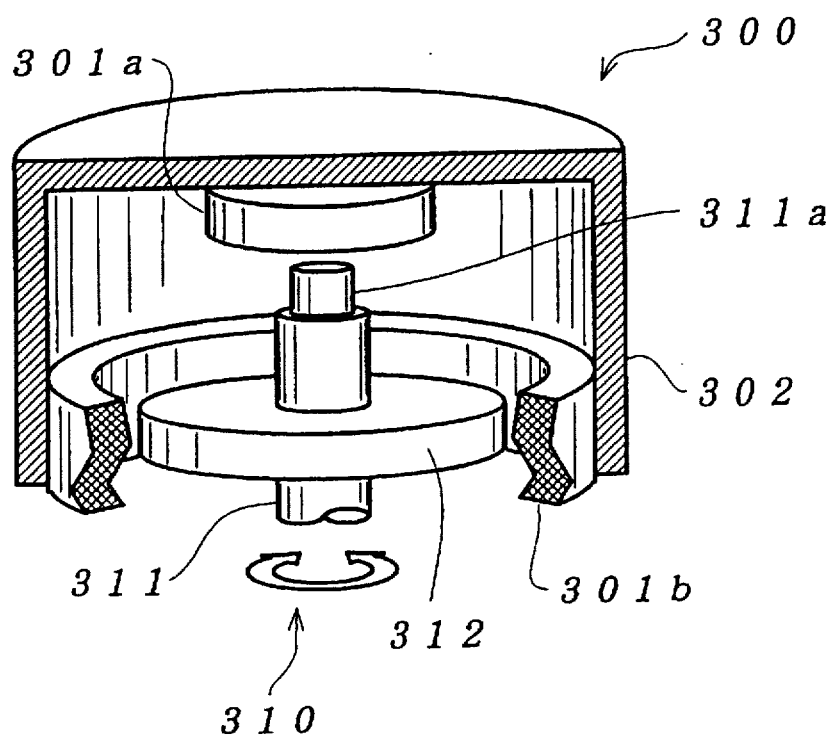
FIG. 20 is a partially sectioned perspective view of a magnetic suspension apparatus showing a fourteenth embodiment of the present invention.

FIG. 20 is a partially sectioned perspective view of a magnetic suspension apparatus showing a fourteenth embodiment of the present invention which is applied to a magnetic bearing which has an increased stiffness in the radial and thrust directions.

As shown in FIG. 20, a stationary part 300 is mainly formed by a circular superconductor 301a, an annular superconductor 301b, and a back yoke 302 for supporting these superconductors. A movable part 310 to be suspended is formed by a bar-shaped ferromagnetic member 311 serving as a shaft, and a circular ferromagnetic member 312. A cold reserving container and a rotary drive mechanism are not shown.

The magnetic flux passes through the circular superconductor 301a, and enters the movable part 310 via a gap. The magnetic flux then passes through the tip 311a of the bar-shaped ferromagnetic member 311 and the circular ferromagnetic member 312, and enters the stationary part 300 via another gap to pass through the annular superconductor 301b and the back yoke 302, thereby completing a magnetically closed loop.

The diameter of the bar-shaped ferromagnetic member 311 and the diameter and thickness of the circular ferromagnetic member 312 are determined such that the areas of the portions which face the circular superconductor 301a and the annular superconductor 301b become smaller than the areas of the regions in the superconductors 301a and 301b where the magnetic flux (not shown) is pinned.

With this structure, the movable part 310 is stably suspended with a predetermined gap while being allowed to rotate. Unlike the previously described embodiment, the mechanism for mainly generating a supporting force in the radial direction and the mechanism for mainly generating a supporting force in the thrust direction are combined to increase the suspending stiffness of the movable part 310 and the stability. Accordingly, when a rotary drive mechanism such as a motor is combined with the apparatus according to the present embodiment, a magnetic bearing can easily be obtained which has an increased stiffness and stability.

In the present embodiment, the movable part 310 does not cross the magnetic flux during the rotation, so that no eddy current flows within the bar-shaped ferromagnetic member 311 or the circular ferromagnetic member 312. Accordingly, it is unnecessary to take measures such as the use of layered silicon steel plates to prevent the generation of eddy current.

Although the magnetic bearing according to the present embodiment can be used singly, a plurality of such a bearing may be arranged to obtain a magnetic bearing having a stronger suspending force or a longer magnetic bearing.

Figure 21:
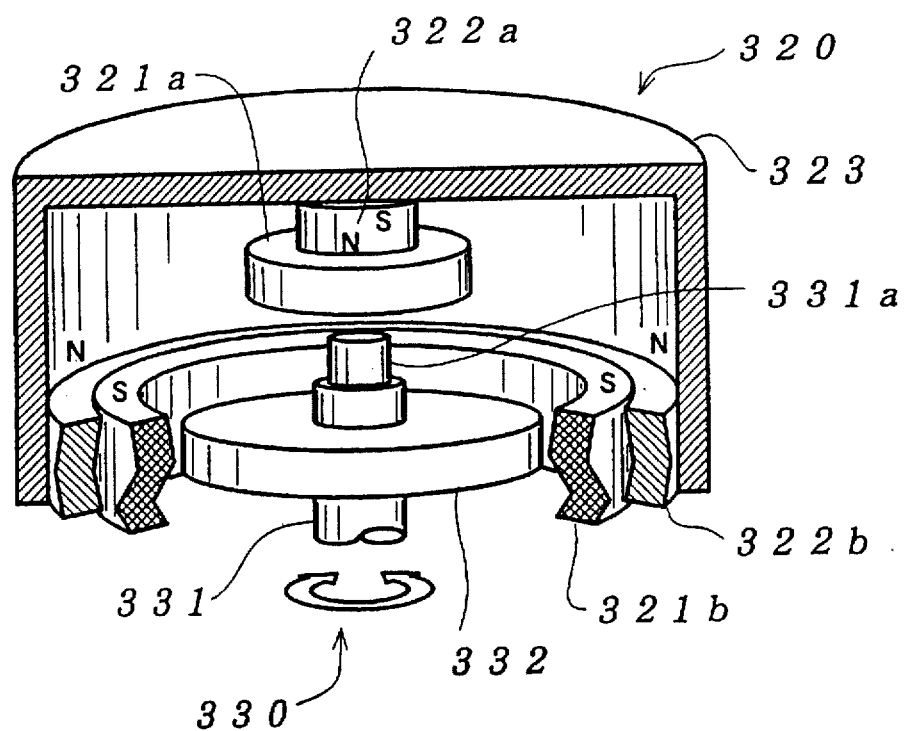
FIG. 21 is a partially sectioned perspective view of a magnetic suspension apparatus showing a fifteenth embodiment of the present invention.

FIG. 21 is a partially sectioned perspective view of a magnetic suspension apparatus showing a fifteenth embodiment of the present invention which is obtained by adding permanent magnets to the superconductor of the fourteenth embodiment.

That is, a circular permanent magnet 322a is provided above the circular superconductor 321a while an annular superconductor 321b and an annular permanent magnet 322b are provided outside a circular ferromagnetic member 332 forming a movable part 330. Also, a back yoke 323 is provided which forms a stationary part 320 while covering the movable part 310.

The magnetic flux passes through the circular permanent magnet 322a and the circular superconductor 321a, and enters the movable part 330 via a gap. The magnetic flux then passes through the tip 331a of the bar-shaped ferromagnetic member 331, the bar-shaped ferromagnetic member 331 and the circular ferromagnetic member 332, and enters the stationary part 320 via another gap to pass through the annular superconductor 321b, the annular permanent magnet 322b, and the back yoke 323, thereby completing a magnetically closed loop.

In the present embodiment, to increase the suspending force and the suspending stability, the circular permanent magnet 322a and the annular permanent magnet 322b for biasing and the back yoke 323 are provided in the stationary part 320. However, these components may be omitted. Also, the magnetic bearing may be formed by using the circular back yoke 323 only, the circular permanent magnet 322a only, or the annular permanent magnet 322b only.

Figure 22:
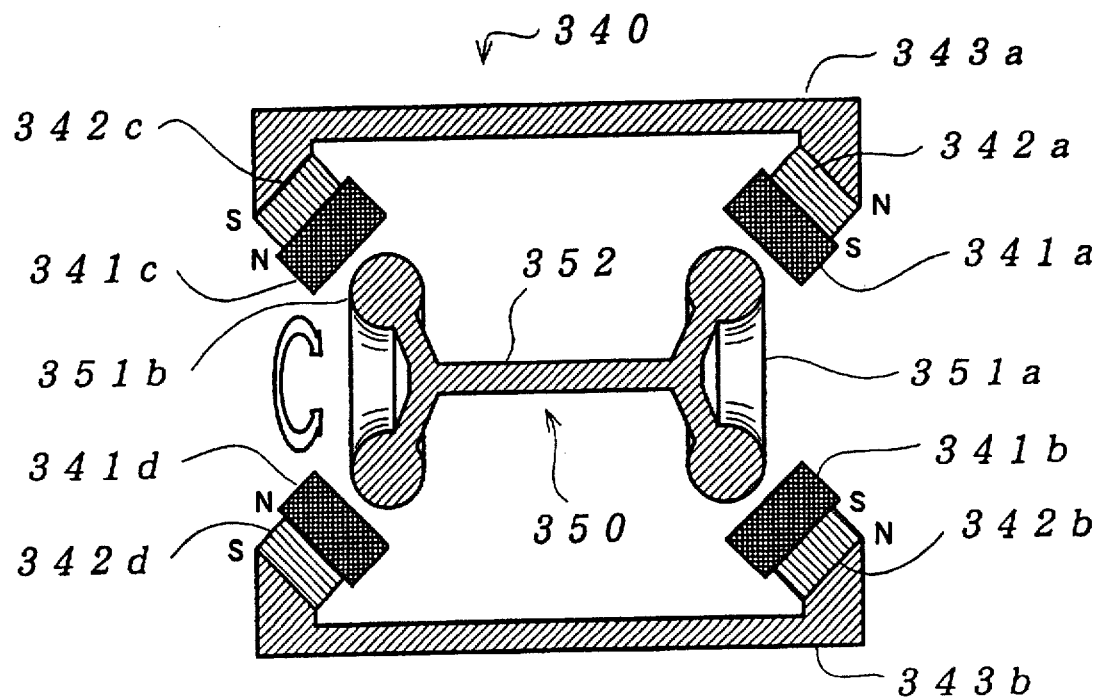
FIG. 22 is a sectional view of a magnetic suspension apparatus showing a sixteenth embodiment of the present invention.

FIG. 22 is a sectional view of a magnetic suspension apparatus showing a sixteenth embodiment of the present invention which is applied to a magnetic bearing which has an increased stiffness in the radial and thrust directions.

As shown in FIG. 22, a stationary part 340 is mainly formed by rectangular parallelepipedonal superconductors 341a–341d which are disposed at an angle of 45° with respect to the rotational center of a movable part 350 and each of which has a strong pinning force, rectangular parallelepipedonal permanent magnets 342a–342d disposed outside the rectangular parallelepipedonal superconductors 341a–341d, and back yokes 343a and 343b arranged outside the rectangular parallelepipedonal permanent magnets 342a–342d. The movable part 350 to be suspended is formed by annular ferromagnetic members 351a and 351b each having a circular cross section, and a ferromagnetic member 352 serving as a shaft. The annular ferromagnetic members 351a and 351b are fixed to the ferromagnetic member 352 by welding or the like. A cold reserving container and a rotary drive mechanism are not shown.

The magnetic flux passes through the rectangular parallelepipedonal permanent magnet 342c and the rectangular parallelepipedonal superconductor 341c, and enters the movable part 350 via a gap. The magnetic flux then passes through the annular ferromagnetic member 351b, the ferromagnetic member 352 and the annular ferromagnetic member 351a, and then enters the stationary part 340 via another gap to flow through the rectangular parallelepipedonal superconductor 341a, the rectangular parallelepipedonal permanent magnet 342a and the back yoke 343a, thereby forming a first loop. Also, the magnetic flux passes through the rectangular parallelepipedonal permanent magnet 342d and the rectangular parallelepipedonal superconductor 341d, and enters the movable part 350 via a gap. The magnetic flux then passes through the annular ferromagnetic member 351b, the ferromagnetic member 352 and the annular ferromagnetic member 351a, and then enters the stationary part 340 via another gap to flow through the rectangular parallelepipedonal superconductor 341b, the rectangular parallelepipedonal permanent magnet 342b and the back yoke 343b, thereby forming a second loop. As a result, two closed loops are magnetically formed.

The size of the annular ferromagnetic members 351a and 351b is determined such that the areas of the portions which face the rectangular parallelepipedonal superconductors 341a–341d become smaller than the areas of the regions in the superconductors 341a–341d where the magnetic flux (not shown) is pinned.

With this structure, the movable part 350 is stably suspended with a predetermined gap while being allowed to rotate. Unlike the previously described embodiment, the rectangular parallelepipedonal superconductors 341a–341d are arranged at an angle of 45° with respect to the rotational center of the movable part 350 so that the suspending stiffness and the stability in the radial and thrust directions are enhanced. Accordingly, when a rotary drive mechanism such as a motor is combined with the apparatus according to the present embodiment, a magnetic bearing can easily be obtained which has an increased stiffness and stability.

Since the movable part 350 can be formed by only combining the annular ferromagnetic members 351a and 351b and the ferromagnetic member 352, the manufacture of the movable part 350 becomes easier. However, the shape of the movable part 350 at its both ends is not limited to the shape shown in FIG. 22.

In the present embodiment, to increase the suspending force and the suspending stability, the rectangular parallelepipedonal permanent magnets 342a-342d for biasing and the back yokes 343a and 343b are provided in the stationary part 340. However, these components may be omitted. Also, the magnetic bearing may be formed by using the back yokes 343a and 343b only, or the rectangular parallelepipedonal permanent magnets 342a-342d only. Of course, the back yokes 343a and 343b may be formed as a single member.

Moreover, the shapes of the superconductors 341a-341d and the rectangular parallelepipedonal permanent magnets 342a-342d for biasing are not limited to the rectangular parallelepipedonal, and may be cylindrical.

Figure 23:
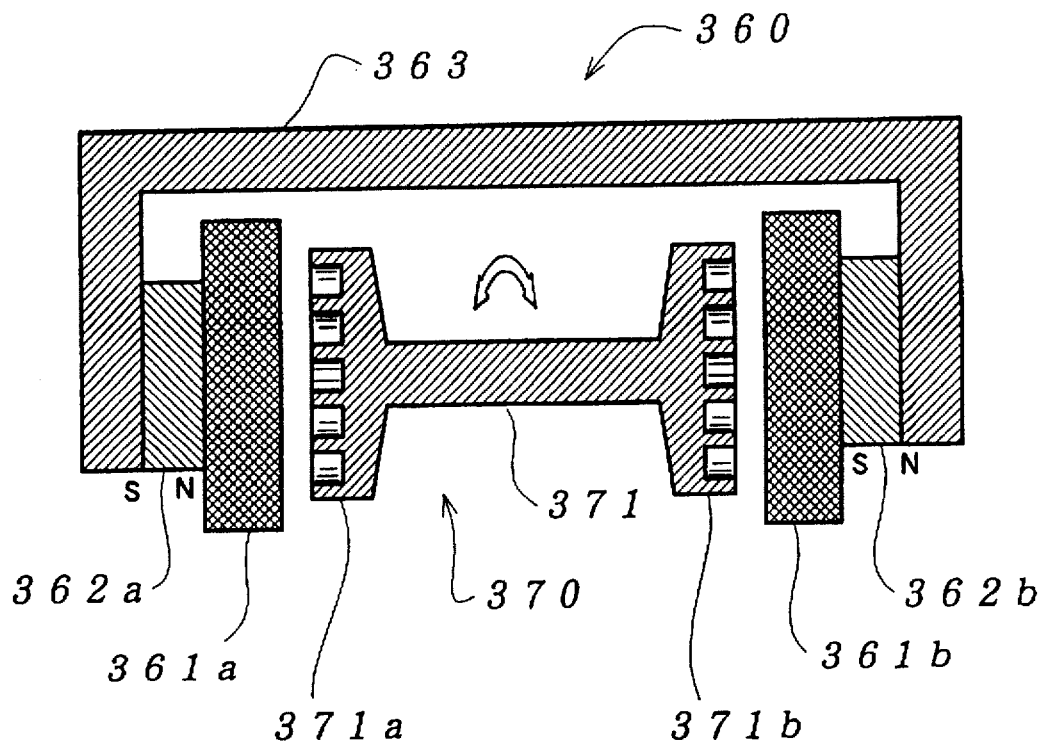
FIG. 23 is a sectional view of a magnetic suspension apparatus showing a seventeenth embodiment of the present invention.

FIG. 23 is a sectional view of a magnetic suspension apparatus showing a seventeenth embodiment of the present invention which is applied to a magnetic bearing.

As shown in FIG. 23, a stationary part 360 is mainly formed by superconductors 361a and 361b each having a strong pinning force, permanent magnets 362a and 362b polarized in the axial direction, and a back yoke 363. A movable part 370 to be suspended has a hand drum-like shape and is formed by a ferromagnetic member 371 with tooth portions which are formed by forming a plurality of circular grooves in the both ends of the member. A cold reserving container and a rotary drive mechanism are not shown.

The magnetic flux passes through the permanent magnet 362a and the superconductor 361a, and enters the movable part 370 via a gap. The magnetic flux then passes through the left tooth portion 371a of the ferromagnetic member 371, the inside portion of the ferromagnetic member 371 and the right tooth portion 371b of the ferromagnetic member 371, and enters the stationary part 360 via another gap to pass through the superconductor 361b, the permanent magnet 362b and the back yoke 363, thereby completing the magnetically closed loop.

The thickness of each tooth and the width and depth of each groove formed in each end of the ferromagnetic member 371 is determined such that the areas of the portions which face the superconductors 361a and 361b become smaller than the areas of the regions in the superconductors 361a and 361d where the magnetic flux (not shown) is pinned.

The apparatus of the present embodiment provides not only the function for concentrating the magnetic flux in the above-described manner but also the function for pulling the magnetic flux which is obtained by arranging the ferromagnetic member outside the region in which the magnetic flux is pinned. For this purpose, the diameter of the ferromagnetic member 371 at both ends thereof is made larger than that of the permanent magnets 362a and 362b, and the teeth are formed in both ends of the ferromagnetic member 371, which ends face the surfaces of the superconductors 361a and 361b where the magnetic flux is not pinned, or only a very small portion of the magnetic flux is pinned.

With the above-described structure, the movable part 370 is stably suspended with a predetermined gap while being allowed to rotate.

Accordingly, when a rotary drive mechanism such as a motor is combined with the apparatus of the present embodiment, a magnetic bearing can easily be constructed.

Although the magnetic bearing according to the present embodiment can be used singly, it may be used in combination to obtain a magnetic suspension apparatus having a larger suspending force or a longer magnetic suspension apparatus.

In the present embodiment, the movable part 370 does not cross the magnetic flux during the rotation, so that no eddy current flows within both ends of the ferromagnetic member 371. Accordingly, it is unnecessary to take measures such as the use of layered silicon steel plates to prevent the generation of eddy current.

In the present embodiment, to increase the suspending force and the suspending stability, the permanent magnets 362a and 362b for biasing and the back yoke 363 are provided in the stationary part 360. However, these components may be omitted. Also, the magnetic bearing may be formed by using the back yoke 363 only, or the permanent magnets 362a and 362b only.

Figure 24:
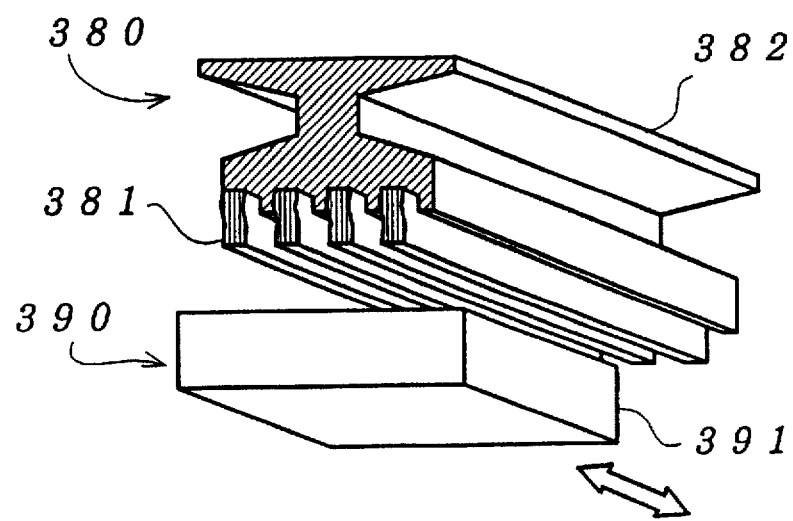
FIG. 24 is a perspective view of a magnetic suspension apparatus showing an eighteenth embodiment of the present invention.

FIG. 24 is a perspective view of a magnetic suspension apparatus showing an eighteenth embodiment of the present invention which is applied to a magnetically suspended carrier.

As shown in FIG. 24, a stationary part 380 is mainly formed by four layered ferromagnetic members 381 made of silicon steel plates or the like and a support base 382 for supporting the layered ferromagnetic members 381. A movable part 390 to be suspended is formed by a superconductor 391 having a strong pinning force. A drive mechanism and a cold reserving container are not shown.

The magnetic flux flows through the superconductor 391 and enters the stationary part 380 via a gap. The magnetic flux then flows through the layered ferromagnetic members 381 and enters the superconductor 391 via another gap, thereby completing a magnetically closed loop.

The thickness and height of each ferromagnetic member 381 forming a tooth and the distance between adjacent ferromagnetic members 381 are determined such that the areas of portions which face the superconductor 391 become smaller than the areas of the regions in the superconductor 391 where the magnetic flux (not shown) is pinned.

The apparatus of the present embodiment provides not only the function for concentrating the magnetic flux in the above-described manner but also the function for pulling the magnetic flux which is obtained by arranging the ferromagnetic member outside the region in which the magnetic flux is pinned, as in the seventeenth embodiment. For this purpose, the layered ferromagnetic members 381 are also disposed at portions of the stationary part 380, which portions face the surface of the superconductor 391 where the magnetic flux is not pinned, or only a very small portion of the magnetic flux is pinned.

With the above-described structure, the movable part 390 is stably suspended with a predetermined gap while being allowed to be freely moved in the longitudinal direction of the layered ferromagnetic members 381.

When a drive mechanism and a workpiece support are combined with the apparatus of the present embodiment, a magnetically suspended carrier can easily be constructed.

When the moving speed of the movable part 390 is low and therefore the stationary part 380, especially, the layered ferromagnetic member 381 is not required to have a high permeability, or when the loss due to eddy current can be ignored, the ferromagnetic member 381 may be formed from a steel ingot.

Although the magnetic suspension apparatus according to the present embodiment can be used singly, it may be used in combination to obtain a magnetic suspension apparatus having a larger suspending force or a longer magnetic suspension apparatus.

Except for some cases, the movable part and the stationary part may be exchanged. That is, the member which has been described as a stationary part can be used as a movable part while the member which has been described as a movable part can be used as a stationary part.

Figure 25:
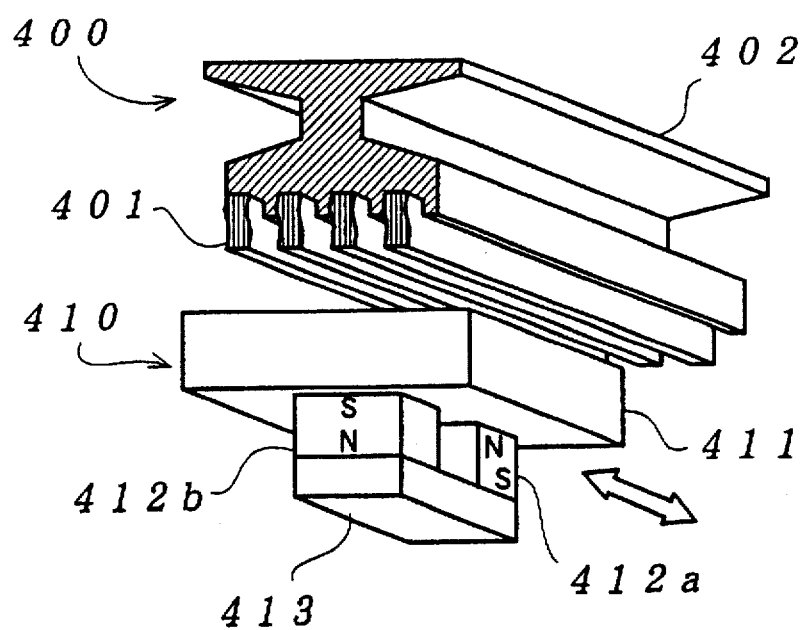
FIG. 25 is a perspective view of a magnetic suspension apparatus showing a nineteenth embodiment of the present invention.

FIG. 25 is a perspective view of a magnetic suspension apparatus showing a nineteenth embodiment of the present invention which can be obtained by adding permanent magnets to the eighteenth embodiment. That is, two permanent magnets 412a and 412b and a back yoke 413 are added to the superconductor 411. The magnetic flux passes through the permanent magnet 412a and the superconductor 411, and enters the stationary part 400 via a gap to pass through the layered ferromagnetic members 401. The magnetic flux then enters the movable part 410 via the gap to pass through the superconductor 411, the permanent magnet 412b and the back yoke 413, thereby completing a magnetically closed loop.

In the present embodiment, a single magnet assembly including two permanent magnets 412a and 412b and a back yoke 413 is arranged right under the superconductor 411 to reduce the leakage of magnetic flux. However, a plurality of magnet assemblies may be provided. The magnet assembly may be formed by a single permanent magnet and a pair of yokes contacting the superconductor 411.

In the present embodiment, to increase the suspending force and the suspending stability, the permanent magnets 412a and 412b for biasing and the back yoke 413 are provided in the movable part 410. However, these components may be omitted. Also, the magnetic suspension apparatus may be formed by using the back yoke 413 only, or the permanent magnets 412a and 412b for biasing only. The layout of the permanent magnets is not limited to the layout disclosed in the present embodiment. Needless to say, the support base 402 of the stationary part 400 may be made of a ferromagnetic material or a non-magnetic material.

Needless to say, the magnetic suspending apparatus formed by a high temperature superconductor and a ferromagnetic member as shown in the above-described embodiments can be combined with an ordinary magnetic suspending apparatus which is formed by the combination of an electromagnet and a ferromagnetic member, the combination of an electromagnet and a permanent magnet, the combination of a superconductor and a permanent magnet, or the combination of a superconductor and an electromagnet to simplify the control of the entire apparatus and to enhance the performance thereof.

Although liquid nitrogen is used as a refrigerant for superconductors in the above-described embodiments, a different refrigerant such as liquid oxygen suitable for the critical temperature of a superconductor may be used if the critical temperature is sufficiently high. When the critical temperature of the superconductor is higher than a normal temperature, it is unnecessary to use a cold reserving container and a refrigerant.

According to the above-described embodiments, the combination of at least a high temperature superconductor and a ferromagnetic member can provide a stable suspending operation in a non-contacting manner without control. Moreover, it is possible to provide a magnetic suspension apparatus which has an increased mechanical strength and is simple, which can be manufactured at a low cost, and which increases the degree of freedom in designing the apparatus.

Especially, when the present invention is applied to a flywheel apparatus for accumulating electrical power in which magnetic suspension apparatus is used as a bearing, it becomes unnecessary to attach permanent magnets to the flywheel which is the movable part of the bearing.

Accordingly, the rotational speed of the flywheel is not limited by the mechanical strength of the permanent magnets.

The present invention is not limited to the above-described embodiments, and may be modified in various ways based on the concept of the present invention. These modifications are not excluded from the scope of the present invention.

INDUSTRIAL APPLICATION

The magnetic suspension apparatuses according to the present invention can be applied to magnetic bearings, transportation systems, and flywheel apparatus for accumulating electrical power, or the like.

We claim:

1. A magnetic suspension apparatus comprising:

a movable part formed by a ferromagnetic member which has a circular plate portion fixed to a rotary shaft and a tubular portion which is coaxially extended from the periphery of said circular plate portion and is fixed thereto;

a stationary part including at least two block-shaped superconductors each of which is provided with a surface facing the end surface of said tubular portion with a predetermined cap between said tubular portion and said block-shaped superconductors;

each of said block-shaped superconductors having a size greater than the thickness of the tubular portion of said ferromagnetic member and having at least one region in which magnetic flux is pinned by cooling the region to a temperature below a critical temperature in a magnetic field to suspend said movable part by a magnetic action in a non-contacting manner by the pinned magnetic flux passing through the gap and the ferromagnetic member; and a circular magnetic member having a diameter of said tubular portion being fixed to said block-shaped superconductors on the side opposite to the side facing the gap.

2. A magnetic suspension apparatus according to claim 1, wherein said stationary part includes a plurality of block-shaped permanent magnets which are disposed between said block-shaped superconductors and said circular magnetic member such that the magnetic poles of said permanent magnets are alternately directed in opposite directions.

3. A magnetic suspension apparatus comprising:

a movable part formed by a ferromagnetic member which has a rotary shaft and a larger diameter portion formed at a part of the rotary shaft;

a stationary part including a circular superconductor which is disposed at a position facing an end surface of said rotary shaft with a predetermined gap therebetween and has a diameter larger than the diameter of said end surface of said rotary shaft, and an annular superconductor which faces an outer circumferential surface of the larger diameter portion of said rotary shaft;

said circular and annular superconductors each having at least one region in which magnetic flux is pinned by cooling the region to a temperature below a critical temperature in a magnetic field such that the pinned magnetic flux passes through said ferromagnetic member to suspend said movable-part by a magnetic action in a non-contacting manner;

a cup-shaped magnetic member supporting said circular superconductor fixed to a bottom surface of said cup-shaped magnetic member through the side of said circular superconductor which is opposite to the side of said circular superconductor facing the gap; and said annular superconductor being fixed to an inner circumferential surface of said cup-shaped magnetic member through the outer circumferential surface of said annular superconductor.

4. A magnetic suspension apparatus according to claim 3, wherein said stationary part includes a cylindrical permanent magnet which is disposed between said circular superconductor and the bottom surface of said cup-shaped magnetic member, which has a diameter smaller than the diameter of said superconductor and which is polarized in the axial direction, and an annular permanent magnet which is disposed between the outer circumferential surface of said annular superconductor and the inner circumferential surface of said cup-shaped magnetic member and which is polarized in the radial direction.

5. A magnetic suspension apparatus comprising:

a movable part formed by a ferromagnetic member having a rotary shaft and at least two circular plates which are coaxially fixed to the rotary shaft with a predetermined axial space therebetween, and a stationary part formed by two annular superconductors which are disposed to surround the circular plates of said ferromagnetic member with respective gaps.

said annular superconductors each having a width in the axial direction greater than the width of the circular plates of said ferromagnetic member and having at least one region in which magnetic flux is pinned by cooling the region to a temperature below a critical temperature in a magnetic field to suspend said movable part by a magnetic action in a non-contacting manner by pinned magnetic flux passing through said ferromagnetic member.

6. A magnetic suspension apparatus according to claim 5, wherein said stationary part includes at least four permanent magnets which are polarized in the radial direction and are disposed on the outer circumferential surface of said annular superconductor such that the magnetic poles of said permanent magnets are alternately directed in opposite directions, and an annular magnetic member disposed outside said permanent magnets.

7. A magnetic suspension apparatus comprising:

a stationary part formed by an elongated magnetic member and at least four elongated ferromagnetic members each of which has a rectangular cross section having a width smaller than the width of said magnetic member and which are arranged in the widthwise direction at a constant pitch, a movable part formed by a rectangular parallelepipedonal superconductor facing said stationary part with a predetermined gap therebetween, said parallelepipedonal superconductor having a width greater than the distance between two ferromagnetic members provided at both outer sides and having at least one region in which magnetic flux is pinned by cooling the region to a temperature below a critical temperature in a magnetic field such that the flux pinned in said superconductor passes through said gap to said ferromagnetic material to suspend said movable part by a magnetic action in a non-contacting manner, and drive means added to one of said ferromagnetic member and said superconductor for linear movement by electromagnetic induction.

8. A magnetic suspension apparatus according to claim 7, wherein said movable part includes two rectangular parallelepipedonal permanent magnets which have poles facing the gap and which are fixed to the side of said superconductor opposite to the side facing the gap along the longitudinal direction of said stationary part such that different poles of said permanent magnets face the gap, and a magnetic member which connects the free ends of said two permanent magnets.

* * * * *

UNITED STATES PATENT AND TRADEMARK OFFICE
CERTIFICATE OF CORRECTION

PATENT NO. : 5,757,098
DATED : May 26, 1998
INVENTOR(S) : HIGUCHI et al

It is certified that error appears in the above-indentified patent and that said Letters Patent is hereby corrected as shown below:

Col. 22, line 37, "cap" should read --gap--.

Signed and Sealed this

Eighth Day of December, 1998

Attest:

Attesting Officer

BRUCE LEHMAN

Commissioner of Patents and Trademarks